United States Patent [19]
Pellicano

[11] Patent Number: 5,481,704
[45] Date of Patent: Jan. 2, 1996

[54] INDEXING/COMPRESSION SCHEME FOR SUPPORTING GRAPHICS AND DATA SELECTION

[75] Inventor: Russell A. Pellicano, North Bayshore, N.Y.

[73] Assignee: Computer Concepts Corp., Bohemia, N.Y.

[21] Appl. No.: 209,385

[22] Filed: Mar. 10, 1994

Related U.S. Application Data

[63] Continuation of Ser. No. 766,860, Sep. 27, 1991, Pat. No. 5,301,315.

[51] Int. Cl.$^6$ ........................................ G06F 17/30
[52] U.S. Cl. .................. 395/600; 395/147; 364/DIG. 1; 364/282.1; 364/283.3; 364/224; 364/224.2
[58] Field of Search ..................... 395/600, 147, 395/161; 364/554, 555, 715.02

[56] References Cited

U.S. PATENT DOCUMENTS

| | | | |
|---|---|---|---|
| 3,568,155 | 3/1971 | Abraham et al. | 395/600 |
| 3,612,660 | 10/1971 | Miller | 341/87 |
| 4,074,235 | 2/1978 | Thomas | 395/600 |
| 4,232,375 | 11/1980 | Paugstat et al. | 395/200 |
| 4,386,416 | 5/1983 | Giltner et al. | 395/375 |
| 4,422,158 | 12/1983 | Galie | 395/400 |
| 4,434,475 | 2/1984 | McCaskill et al. | 395/156 |
| 4,555,771 | 11/1985 | Hayashi | 395/600 |
| 4,611,298 | 9/1986 | Schuldt | 395/600 |
| 4,752,889 | 6/1988 | Rappaport et al. | 395/12 |
| 4,782,325 | 11/1988 | Jeppsson et al. | 341/55 |
| 4,817,036 | 3/1989 | Millett et al. | 395/600 |
| 4,961,139 | 10/1990 | Hong et al. | 395/600 |
| 5,237,681 | 8/1993 | Kagan et al. | 395/600 |
| 5,301,315 | 4/1994 | Pellicano | 395/600 |

FOREIGN PATENT DOCUMENTS

| | | |
|---|---|---|
| 0199909A3 | 2/1986 | European Pat. Off. . |
| 0199909A2 | 2/1986 | European Pat. Off. . |
| 0449293A3 | 3/1991 | European Pat. Off. . |
| 0449293A2 | 3/1991 | European Pat. Off. . |

OTHER PUBLICATIONS

Rowe, Neil Co., "Absolute Bounds on Set Intersection and Union Sizes from Distribution Information," *IEEE Transactions on Software Engineering*, vol. 14, No. 7, Jul. 1988, pp. 1033–1048.

Sugiyama, Kozo et al., "Methods for Visual Understanding of Hierarchical System Structures," *IEEE Transactions on Systems, Man, and Cybernetics*, vol. SMC–II, No. 2, Feb. 1981, pp. 109 . 125.

Burns, L. M., et al., "A Graphical Entity–Relationship Database Browser", Computer Society Press of the IEEE, 1988, pp. 694–704.

Agu R. Ets et al., "Automating Gao's Agency Image: an Application of Graphics Software", *Office Automation Symposium*, Apr. 27, 1987, pp. 27–34.

"Title Converting Multi–Component Charts to Pie Charts", *IBM Technical Disclosure Bulletin*, vol. 28, No. 10, Mar. 1986, pp. 4264–4267.

*Primary Examiner*—Paul V. Kulik
*Attorney, Agent, or Firm*—Scully, Scott, Murphy & Presser

[57] ABSTRACT

A method for interactively selecting and displaying a distribution of all data fields in a selected database. The primary function of the methodology is to allow a user to view the data contained within a selected database in a graphical format. Additionally, the user has the capability of selecting specific sets of data for more detailed display as well as determining the effect of the selection on all remaining data fields which comprise the selected database. The first step in the process is the accessing of the particular database from the host system. Once the selected database has been accessed, a distribution matrix for each field in the selected database is constructed from the data contained within the selected database. The distribution matrix is then graphically displayed on any type of graphical display unit. From this initial graphic display, the user can make various selections for detailed graphical display and study and analyze the data structure and data content of the database.

10 Claims, 24 Drawing Sheets

FIG. 4

| RECORD | VALUE |
|--------|-------|
| 1 | 12.7 |
| 2 | 14.8 |
| 3 | 17.9 |
| 4 | 22.4 |
| 5 | 23.2 |
| 6 | 12.7 |
| 7 | 12.7 |
| 8 | 14.8 |
| 9 | 19.7 |
| 10 | 7.9 |
| 11 | 8.6 |

MAXIMUM VALUE = 23.2 = MAXV
MINIMUM VALUE = 7.9 = MINV

FIG. 5

| BIN NO. | RANGE |
|---------|-------|
| 1 | 7.90 to 9.29 |
| 2 | 9.30 to 10.68 |
| 3 | 10.69 to 12.08 |
| 4 | 12.09 to 13.48 |
| 5 | 13.49 to 14.88 |
| 6 | 14.89 to 16.28 |
| 7 | 16.29 to 17.68 |
| 8 | 17.69 to 19.08 |
| 9 | 19.09 to 20.48 |
| 10 | 20.49 to 21.88 |
| 11 | 21.89 to 23.28 |

| RECORD | VALUE | BIN | | BIN NO. | RANGE |
|---|---|---|---|---|---|
| 1 | 12.7 | 4 | | 1 | 7.90 to 9.29 |
| 2 | 14.8 | 5 | | 2 | 9.30 to 10.68 |
| 3 | 17.9 | 8 | | 3 | 10.69 to 12.08 |
| 4 | 22.4 | 11 | | 4 | 12.09 to 13.48 |
| 5 | 23.2 | 11 | | 5 | 13.49 to 14.88 |
| 6 | 12.7 | 4 | | 6 | 14.89 to 16.28 |
| 7 | 12.7 | 4 | | 7 | 16.29 to 17.68 |
| 8 | 14.8 | 5 | | 8 | 17.69 to 19.08 |
| 9 | 19.7 | 9 | | 9 | 19.09 to 20.48 |
| 10 | 7.9 | 1 | | 10 | 20.49 to 21.88 |
| 11 | 8.6 | 1 | | 11 | 21.89 to 23.28 |

```
NMEMONIC - RECBINFR   TYPE-(0)   0
            RECBINTO        (1)   0
            RECBINNO        (2)   1
            RECMAPNO        (3)   5
            RECSTRNO        (4)  -1
            RECMAPWD        (5)  NOT USED
```

| RECORD | VALUE | BIN | | BIN NO. | RANGE |
|---|---|---|---|---|---|
| 1 | 12.7 | 4 | | 1 | 7.90 to 9.29 |
| 2 | 14.8 | 5 | | 2 | 9.30 to 10.68 |
| 3 | 17.9 | 8 | | 3 | 10.69 to 12.08 |
| 4 | 22.4 | 11 | | 4 | 12.09 to 13.48 |
| 5 | 23.2 | 11 | | 5 | 13.49 to 14.88 |
| 6 | 12.7 | 4 | | 6 | 14.89 to 16.28 |
| 7 | 12.7 | 4 | | 7 | 16.29 to 17.68 |
| 8 | 14.8 | 5 | | 8 | 17.69 to 19.08 |
| 9 | 19.7 | 9 | | 9 | 19.09 to 20.48 |
| 10 | 7.9 | 1 | | 10 | 20.49 to 21.88 |
| 11 | 8.6 | 1 | | 11 | 21.89 to 23.28 |

```
NMEMONIC - RECBINFR   TYPE-(0)   0
            RECBINTO        (1)   0
            RECBINNO        (2)   1
            RECMAPNO        (3)   5
            RECSTRNO        (4)  -2
            RECMAPWD        (5)  NOT USED
```

FIG. 10

| RECORD | VALUE | BIN | | BIN NO. | RANGE | |
|---|---|---|---|---|---|---|
| 1 | 12.7 | 4 | | 1 | 7.90 to | 9.29 |
| 2 | 14.8 | 5 | | 2 | 9.30 to | 10.68 |
| 3 | 17.9 | 8 | | 3 | 10.69 to | 12.08 |
| 4 | 22.4 | 11 | | 4 | 12.09 to | 13.48 |
| 5 | 23.2 | 11 | | 5 | 13.49 to | 14.88 |
| 6 | 12.7 | 4 | | 6 | 14.89 to | 16.28 |
| 7 | 12.7 | 4 | | 7 | 16.29 to | 17.68 |
| 8 | 14.8 | 5 | | 8 | 17.69 to | 19.08 |
| 9 | 19.7 | 9 | | 9 | 19.09 to | 20.48 |
| 10 | 7.9 | | | 10 | 20.49 to | 21.88 |
| 11 | 8.6 | | | 11 | 21.89 to | 23.28 |

```
[0][0][0][0][0][0][0][0][1][0][0][1][1][0][0][0]
```

NMEMONIC - RECBINFR  TYPE-(0)  0
           RECBINTO      (1)  0
           RECBINNO      (2)  1
           RECMAPNO      (3)  5
           RECSTRNO      (4) -3
           RECMAPWD      (5)  NOT USED

FIG. 11

| RECORD | VALUE | BIN | | BIN NO. | RANGE | |
|---|---|---|---|---|---|---|
| 1 | 12.7 | 4 | | 1 | 7.90 to | 9.29 |
| 2 | 14.8 | 5 | | 2 | 9.30 to | 10.68 |
| 3 | 17.9 | 8 | | 3 | 10.69 to | 12.08 |
| 4 | 22.4 | 11 | | 4 | 12.09 to | 13.48 |
| 5 | 23.2 | 11 | | 5 | 13.49 to | 14.88 |
| 6 | 12.7 | 4 | | 6 | 14.89 to | 16.28 |
| 7 | 12.7 | 4 | | 7 | 16.29 to | 17.68 |
| 8 | 14.8 | 5 | | 8 | 17.69 to | 19.08 |
| 9 | 19.7 | 9 | | 9 | 19.09 to | 20.48 |
| 10 | | | | 10 | 20.49 to | 21.88 |
| 11 | 8.6 | 1 | | 11 | 21.89 to | 23.28 |

```
[0][0][0][0][0][1][0][0][1][0][0][1][1][0][0][0]
```

NMEMONIC - RECBINFR  TYPE-(0)  0
           RECBINTO      (1)  0
           RECBINNO      (2)  1
           RECMAPNO      (3)  5
           RECSTRNO      (4) -4
           RECMAPWD      (5)  NOT USED

FIG. 12

| RECORD | VALUE | BIN | | BIN NO. | RANGE |
|--------|-------|-----|---|---------|-------|
| 1  | 12.7 | 4  | | 1  | 7.90 to 9.29 |
| 2  | 14.8 | 5  | | 2  | 9.30 to 10.68 |
| 3  | 17.9 | 8  | | 3  | 10.69 to 12.08 |
| 4  | 22.4 | 11 | | 4  | 12.09 to 13.48 |
| 5  | 23.2 | 11 | | 5  | 13.49 to 14.88 |
| 6  | 12.7 | 4  | | 6  | 14.89 to 16.28 |
| 7  | 12.7 | 4  | | 7  | 16.29 to 17.68 |
| 8  | 14.8 | 5  | | 8  | 17.69 to 19.08 |
| 9  | 19.7 | 9  | | 9  | 19.09 to 20.48 |
| 10 |      |    | | 10 | 20.49 to 21.88 |
| 11 | 8.6  | 1  | | 11 | 21.89 to 23.28 |

```
0 0 0 0 0 1 0 0 1 0 0 1 1 0 0 0
```

NMEMONIC - RECBINFR    TYPE-(0)   0        0
           RECBINTO         (1)   0        0
           RECBINNO         (2)   1        2
           RECMAPNO         (3)   5        6
           RECSTRNO         (4)  -4       -4
           RECMAPWD         (5)  N/A 0001

FIG. 13

| RECORD | VALUE | BIN | | BIN NO. | RANGE |
|--------|-------|-----|---|---------|-------|
| 1  | 12.7 | 4  | | 1  | 7.90 to 9.29 |
| 2  | 14.8 | 5  | | 2  | 9.30 to 10.68 |
| 3  | 17.9 | 8  | | 3  | 10.69 to 12.08 |
| 4  | 22.4 | 11 | | 4  | 12.09 to 13.48 |
| 5  | 23.2 | 11 | | 5  | 13.49 to 14.88 |
| 6  | 12.7 | 4  | | 6  | 14.89 to 16.28 |
| 7  | 12.7 | 4  | | 7  | 16.29 to 17.68 |
| 8  | 14.8 | 5  | | 8  | 17.69 to 19.08 |
| 9  | 19.7 | 9  | | 9  | 19.09 to 20.48 |
| 10 | 7.9  | 1  | | 10 | 20.49 to 21.88 |
| 11 | 8.6  | 1  | | 11 | 21.89 to 23.28 |

```
0 0 0 0 0 1 0 0 1 0 0 1 1 0 0 0
```

NMEMONIC - RECBINFR    TYPE-(0)   0        0
           RECBINTO         (1)   0        0
           RECBINNO         (2)   1        2
           RECMAPNO         (3)   5        6
           RECSTRNO         (4)  -1       -1
           RECMAPWD         (5)  N/A 0010 = REC 6 BIT POSITION (HEX)

FIG.14

| RECORD | VALUE | BIN | | BIN NO. | RANGE |
|---|---|---|---|---|---|
| 1 | 12.7 | 4 | | 1 | 7.90 to 9.29 |
| 2 | 14.8 | 5 | | 2 | 9.30 to 10.68 |
| 3 | 17.9 | 8 | | 3 | 10.69 to 12.08 |
| 4 | 22.4 | 11 | ┌─ | 4 | 12.09 to 13.48 |
| 5 | 23.2 | 11 | │ | 5 | 13.49 to 14.88 |
| 6 | 12.7 | 4 | │ | 6 | 14.89 to 16.28 |
| 7 | 12.7 | 4 ─┘ | | 7 | 16.29 to 17.68 |
| 8 | 14.8 | 5 | | 8 | 17.69 to 19.08 |
| 9 | 19.7 | 9 | | 9 | 19.09 to 20.48 |
| 10 | 7.9 | 1 | | 10 | 20.49 to 21.88 |
| 11 | 8.6 | 1 | | 11 | 21.89 to 23.28 |

| 0 | 0 | 0 | 0 | 0 | 1 | 0 | 0 | 1 | 0 | 0 | 1 | 1 | 0 | 0 | 0 |

NMEMONIC - RECBINFR TYPE-(0)    0    0    0
            RECBINTO      (1)    0    0    0
            RECBINNO      (2)    1    2    3
            RECMAPNO      (3)    5    6    6
            RECSTRNO       (4)   -1   -1   -1
            RECMAPWD     (5)   N/A   0010   0030   RECORD 6+7 (HEX)

FIG.15

| RECORD | VALUE | BIN | | BIN NO. | RANGE |
|---|---|---|---|---|---|
| 1 | 12.7 | 4 | | 1 | 7.90 to 9.29 |
| 2 | 14.8 | 5 | | 2 | 9.30 to 10.68 |
| 3 | 17.9 | 8 | | 3 | 10.69 to 12.08 |
| 4 | 22.4 | 11 | | 4 | 12.09 to 13.48 |
| 5 | 23.2 | 11 | ─┐ | 5 | 13.49 to 14.88 |
| 6 | 12.7 | 4 | │ | 6 | 14.89 to 16.28 |
| 7 | 12.7 | 4 | │ | 7 | 16.29 to 17.68 |
| 8 | 14.8 | 5 ─┘ | | 8 | 17.69 to 19.08 |
| 9 | 19.7 | 9 | | 9 | 19.09 to 20.48 |
| 10 | 7.9 | 1 | | 10 | 20.49 to 21.88 |
| 11 | 8.6 | 1 | | 11 | 21.89 to 23.28 |

| 0 | 0 | 0 | 0 | 0 | 1 | 0 | 0 | 1 | 0 | 0 | 1 | 1 | 0 | 0 | 0 |

NMEMONIC - RECBINFR TYPE-(0)    0    0
            RECBINTO      (1)    0    0
            RECBINNO      (2)    1    2
            RECMAPNO      (3)    5    6
            RECSTRNO       (4)   -2   -2
            RECMAPWD     (5)   N/A   0020   RECORD 8 (HEX)

FIG. 16

| RECORD | VALUE | BIN | | BIN NO. | RANGE |
|--------|-------|-----|---|---------|-------|
| 1 | 12.7 | 4 | | 1 | 7.90 to 9.29 |
| 2 | 14.8 | 5 | | 2 | 9.30 to 10.68 |
| 3 | 17.9 | 8 | | 3 | 10.69 to 12.08 |
| 4 | 22.4 | 11 | | 4 | 12.09 to 13.48 |
| 5 | 23.2 | 11 | | 5 | 13.49 to 14.88 |
| 6 | 12.7 | 4 | | 6 | 14.89 to 16.28 |
| 7 | 12.7 | 4 | | 7 | 16.29 to 17.68 |
| 8 | 14.8 | 5 | | 8 | 17.69 to 19.08 |
| 9 | 19.7 | 9 | | 9 | 19.09 to 20.48 |
| 10 | 7.9 | 1 | | 10 | 20.49 to 21.88 |
| 11 | 8.6 | 1 | | 11 | 21.89 to 23.28 |

| 0 | 0 | 0 | 0 | 0 | 1 | 0 | 1 | 1 | 0 | 0 | 1 | 1 | 0 | 0 | 0 |

```
NMEMONIC - RECBINFR    TYPE - (0)   0
           RECBINTO           (1)   0
           RECBINNO           (2)   1
           RECMAPNO           (3)   5
           RECSTRNO           (4)  -9
           RECMAPWD           (5)   N/A
```

FIG. 17

| RECORD | VALUE | BIN | | BIN NO. | RANGE |
|--------|-------|-----|---|---------|-------|
| 1 | 12.7 | 4 | | 1 | 7.90 to 9.29 |
| 2 | 14.8 | 5 | | 2 | 9.30 to 10.68 |
| 3 | 17.9 | 8 | | 3 | 10.69 to 12.08 |
| 4 | 22.4 | 11 | | 4 | 12.09 to 13.48 |
| 5 | 23.2 | 11 | | 5 | 13.49 to 14.88 |
| 6 | 12.7 | 4 | | 6 | 14.89 to 16.28 |
| 7 | 12.7 | 4 | | 7 | 16.29 to 17.68 |
| 8 | 14.8 | 5 | | 8 | 17.69 to 19.08 |
| 9 | 19.7 | 9 | | 9 | 19.09 to 20.48 |
| 10 | 7.9 | 1 | | 10 | 20.49 to 21.88 |
| 11 | 8.6 | 1 | | 11 | 21.89 to 23.28 |

| 0 | 0 | 0 | 0 | 0 | 1 | 0 | 1 | 1 | 0 | 0 | 1 | 1 | 0 | 0 | 1 |

```
NMEMONIC - RECBINFR    TYPE - (0)   0
           RECBINTO           (1)   0
           RECBINNO           (2)   1
           RECMAPNO           (3)   5
           RECSTRNO           (4) -10
           RECMAPWD           (5)   N/A
```

FIG. 18

| RECORD | VALUE | BIN |
|--------|-------|-----|
| 1 | 12.7 | 4 |
| 2 | 14.8 | 5 |
| 3 | 17.9 | 8 |
| 4 | 22.4 | 11 |
| 5 | 23.2 | 11 |
| 6 | 12.7 | 4 |
| 7 | 12.7 | 4 |
| 8 | 14.8 | 5 |
| 9 | 19.7 | 9 |
| 10 | 7.9 | 1 |
| 11 | 8.6 | 1 |

| BIN NO. | RANGE |
|---------|-------|
| 1 | 7.90 to 9.29 |
| 2 | 9.30 to 10.68 |
| 3 | 10.69 to 12.08 |
| 4 | 12.09 to 13.48 |
| 5 | 13.49 to 14.88 |
| 6 | 14.89 to 16.28 |
| 7 | 16.29 to 17.68 |
| 8 | 17.69 to 19.08 |
| 9 | 19.09 to 20.48 |
| 10 | 20.49 to 21.88 |
| 11 | 21.89 to 23.28 |

`0 0 0 0 0 1 0 1 1 0 0 1 1 0 0 1`

| NMEMONIC | TYPE | | |
|----------|------|---|---|
| RECBINFR | (0) | 0 | 0 |
| RECBINTO | (1) | 0 | 0 |
| RECBINNO | (2) | 1 | 2 |
| RECMAPNO | (3) | 5 | 6 |
| RECSTRNO | (4) | -10 | -10 |
| RECMAPWD | (5) | N/A | 0001 = RECORD 11 (HEX) |

FIG. 19

| BIN NO. | 1 | 4 | 5 | 8 | 9 | 11 |
|---------|---|---|---|---|---|----|
| RECBINFR | 0 | 0 | 0 | 0 | 0 | 0 |
| RECBINTO | 0 | 0 | 0 | 0 | 0 | 0 |
| RECBINNO | 2 | 3 | 2 | 1 | 1 | 2 |
| RECMAPNO | 6 | 6 | 6 | 5 | 5 | 6 |
| RECSTRNO | -10 | -1 | -2 | -3 | -9 | -4 |
| RECMAPWD | 0001 | 0030 | 0020 | - | - | 0001 |

INDEXING/COMPRESSION SCHEME FOR SUPPORTING GRAPHICS AND DATA SELECTION

CROSS REFERENCE TO RELATED APPLICATION

This application is a continuation of U.S. Ser. No. 07/766,860 entitled Indexing/Compression Scheme For Supporting Graphics and Data Selection and filed Sep. 27, 1991.

BACKGROUND OF THE INVENTION

1. Field of the Invention

The present invention relates to a general indexing and compression scheme for supporting graphics and data selection, and more particularly, to a method for displaying and selecting a distribution of all data fields in a selected database. The method of the present invention allows a user to choose fields in a particular database, build a distribution of the data in the fields, graphically view the data structure, and select specific sets of data to determine the effect of adding or subtracting data to the selected sets on the remaining data fields.

2. Discussion of the Prior Art

Over the past twenty years or so, advancement in the art of computerized information storage and retrieval has significantly expanded man's capability for efficiently assessing information. Todays computers with enhanced integrated circuit technology are capable of storing tremendous amounts of information, or to be more exact, data. Accordingly, there is an ever increasing need for the development of systems and processes capable of managing the data and which permit the efficient utilization of the data. The efficiency of computerized information storage and retrieval systems is directly related to how efficiently the database can be searched and how quickly records from the database can be retrieved. There are a plurality of systems and methods currently available which utilize various combinations of filing schemes, indexing schemes, and data compression schemes to enhance the efficiency of data manipulation; however, the efficient retrieval of data is really only the first step in the process. The display of the data in a way that is meaningful to the system user is a second and necessary step of the process, because no matter how fast one can access data, if the data retrieved is arbitrarily displayed on the screen or monitor, then the data is meaningless to the user. In addition to displaying the data in a meaningful way, the system user should have the capability of selectively displaying certain detailed aspects of the data structure and determining the effect of adding or deleting data to the selected sets on the remaining data fields.

The prior art references individually disclose systems and methods for the filing, indexing, compression, retrieval, and the display of data in a computer system; however, there appears to be no reference disclosing a system or method for the filling, indexing, compression, retrieval, and display of data in one single embodiment wherein the system user has the capability of selecting specific sets of data to determine the representative effect on the remaining data fields. The following references are representative examples of state of the art systems and methods capable of performing some of the above listed functions, but not all.

In U.S. Pat. No. 4,817,036, Millett et al. discloses a computer system and method for database indexing and information retrieval. A number of keywords are selected and each record of a database is searched to determine in which records each keyword appears. The central processing unit of the system then creates a vector of each keyword which identifies each record number of the database where the keyword appears and numerically sorts the record numbers. A special bit processor next transforms each vector into a bit string that is identified by one of the keywords. The bit strings are returned to the central processing unit and stored in secondary storage so as to form an index for the database. To retrieve information, one or more keywords are input to the central processing unit. The input keywords are used by the central processing unit to identify the bit string for each keyword. The keywords may be logically joined using "AND", "OR", and/or "NOT" commands. Each bit string retrieved from the index is then sent to the special purpose bit processor, which combines the bit strings according to the particular command. The resultant bit string is transformed by the bit processor into a vector which is returned to the central processing unit and which then is used to identify the individual records which contain the combined keywords.

In U.S. Pat. No. 4,961,139, Hong et al. discloses a database management system for real-time applications. A real-time database provides the predictable, high speed data access required for on-line applications, while providing flexible searching capabilities. The data retrieval routines include the option to "read-through-lock" to access data in locked data tables, the capability to directly access the data using tuple identifiers, and the capability to directly access unformatted data from input areas which contain blocks of unformatted data. The data updating routines include an option to omit index updating when updating data and an option to update data in a locked data table. Multiple indexes can be defined for a data table. Thus, high speed searches can be performed based on a variety of data fields. The data storage and retrieval mechanisms are independent and there are hash index tables that connect the multiple index keys to the data tables. The data table structure includes a column defined for storing tuple identifier strings. These tuple identifiers can be used as pointers for chaining to related data stored in other data tables. The database has relatively small programmable memory. There is a common structure for user data tables, index tables, and system data tables. The database includes a minimum number of routines with certain routines providing multiple functionality.

In U.S. Pat. No. 4,232,375, Paugstat et al. discloses a data compression system and apparatus. The system compresses a binary data message generated by a digital input device. The compression process is based upon the deletion of redundant information. The data compression apparatus includes means for storing portions of a first data message generated by a terminal device as the result of a merchandising transaction performed during the time the CPU is disabled, counter means for deleting all redundant data characters of each data message, means for comparing preselected data characters of each succeeding data message with the corresponding data characters of the first data message stored in the terminal device for deleting those data characters when a comparison is found, and table look-up means for selecting a start of record character in accordance with a data character representing the type of data transaction being processed, the start of record character indicating the start of the compressed data record in addition to the transaction type where there is an absence of data in another portion of the compressed data record.

The first reference is representative of a group of references directed to systems and methods for the indexing and retrieval of data in a database. The second reference is representative of a group of references directed to the creation of databases and database management systems. The third reference is representative of a group of references directed to systems and methods for the compression of data to avoid wasting memory. None of the cited references, however, specifically discloses a system which utilizes a process wherein a distribution of data is built from the data contained in a particular database and then graphically displayed with the capability to selectively add or delete data to the distribution and determine the effect of such addition or deletion of data on the remaining data fields in the distribution built from the data contained within the particular database.

SUMMARY OF THE INVENTION

The present invention is directed to a method for displaying and selecting a distribution of all data fields in a selected database. The method for displaying and selecting of the present invention provides for the construction of a distribution matrix for each field in a given record which allows analysis of the selected database to incorporate graphical visualization of the data structure and content. The primary function of the distribution is to allow the user to view the data in a graphical format; however, the method also provides the user with the capability of selecting specific sets of data to be displayed and to determine the effect of the selection on all remaining data fields which comprise the selected database. The first step in the process includes the step of accessing the particular database from a host system having at least one database resident thereon. The databases that can be accessed are the original databases in vendor format. The database is accessed in order to build the distribution from the data in the database. The next step in the process is to construct the distribution from the data contained in the database. The construction of the distribution or distribution matrix is a multi-step process which prepares a representation of the data contained in the database for display and selection. Once the construction of the distribution is complete, the display of the distribution for the selected data fields in the selected database is performed. At this point, the user can make "what if" selections and thereby select specific sets of data to determine the effect of the selection on all of the data fields which comprise the selected database and display a detailed distribution of the data based upon the step of selecting specific sets of data.

The method of the present invention provides a PC-based tool for access and analysis of information across heterogeneous databases. It is intended to enhance costly and inefficient database management systems and to further provide a powerful graphical user interface for comprehensive viewing of the data. The method incorporates a highly efficient matrix indexing technology which allows for rapid access to the information contained within any of a number of databases, and allows for interfacing to major database management systems such as IDMS or SQL/DS for mainframe computers, Oracle or Sybase for mid-range computers, and Paradox or Dbase for micro computers. The distribution construction process utilizes processes which vary for each data type allowed in the various databases which provides the present invention with great versatility.

The present invention provides for a user friendly, completely graphical and menu driven software package which provides a method for displaying and selecting a distribution of all data fields in a selected database. A user of the software package can view the contents of the database in graphical format and make selections of specific sets of data currently displayed and then view the detailed selection and its effect on the remaining data associated with the primary selection. The software package is simple to install, and only requires approximately 250K of memory. The software package is an order of magnitude faster than currently available query systems and is compatible with most commonly used standard databases. The software package can also be utilized with non-standard databases. For non-standard databases, an entry screen is used to define application generated record structures. The entry screen provides a series of questions enabling the system user to define the application.

BRIEF DESCRIPTION OF DRAWINGS

FIG. 4 is tabular representation of a sample of database records and their corresponding field values.

FIG. 5 is a tabular representation of BIN ranges for the field values illustrated in FIG. 4.

FIG. 10 is a diagrammatic representation of the distribution matrix for record number 3.

FIG. 11 is a diagrammatic representation of the distribution matrix for record number 4.

FIG. 12 is a diagrammatic representation of the distribution matrix for record number 5.

FIG. 13 is a diagrammatic representation of the distribution matrix for record number 6.

FIG. 14 is a diagrammatic representation of the distribution matrix for record number 7.

FIG. 15 is a diagrammatic representation of the distribution matrix for record number 8.

FIG. 16 is a diagrammatic representation of the distribution matrix for record number 9.

FIG. 17 is a diagrammatic representation of the distribution matrix for record number 10.

FIG. 18 is a diagrammatic representation of the distribution matrix for record number 11.

FIG. 19 is a tabular representation of the final data content of the BIN work area.

DESCRIPTION OF THE PREFERRED EMBODIMENTS

The present invention is directed to a method for displaying and selecting a distribution of all data fields in a selected database. A database is an organized array of files where data files are fully integrated and the online access of data from these files is possible. A given database file contains a number of fields grouped together to form a record of information. Each record is a complete set of information that can be used in the analysis of the content of the database. The present invention provides for the creation of a distribution matrix for each field, in a selected database which allows analysis of the database to incorporate graphical visualization of the data structure and content. The fields are processed to build a complete matrix array of the field information. The structure of the matrix array shall support the process to display the data content of the field. The primary function of this distribution is to allow the user to view the data content of the file in a graphical format. However, the present invention also provides the user with the capability of selecting specific sets of data to be displayed graphically and to determine the effect of the selection on all the remaining data fields which comprise the particular database if desired.

Figure 1A:
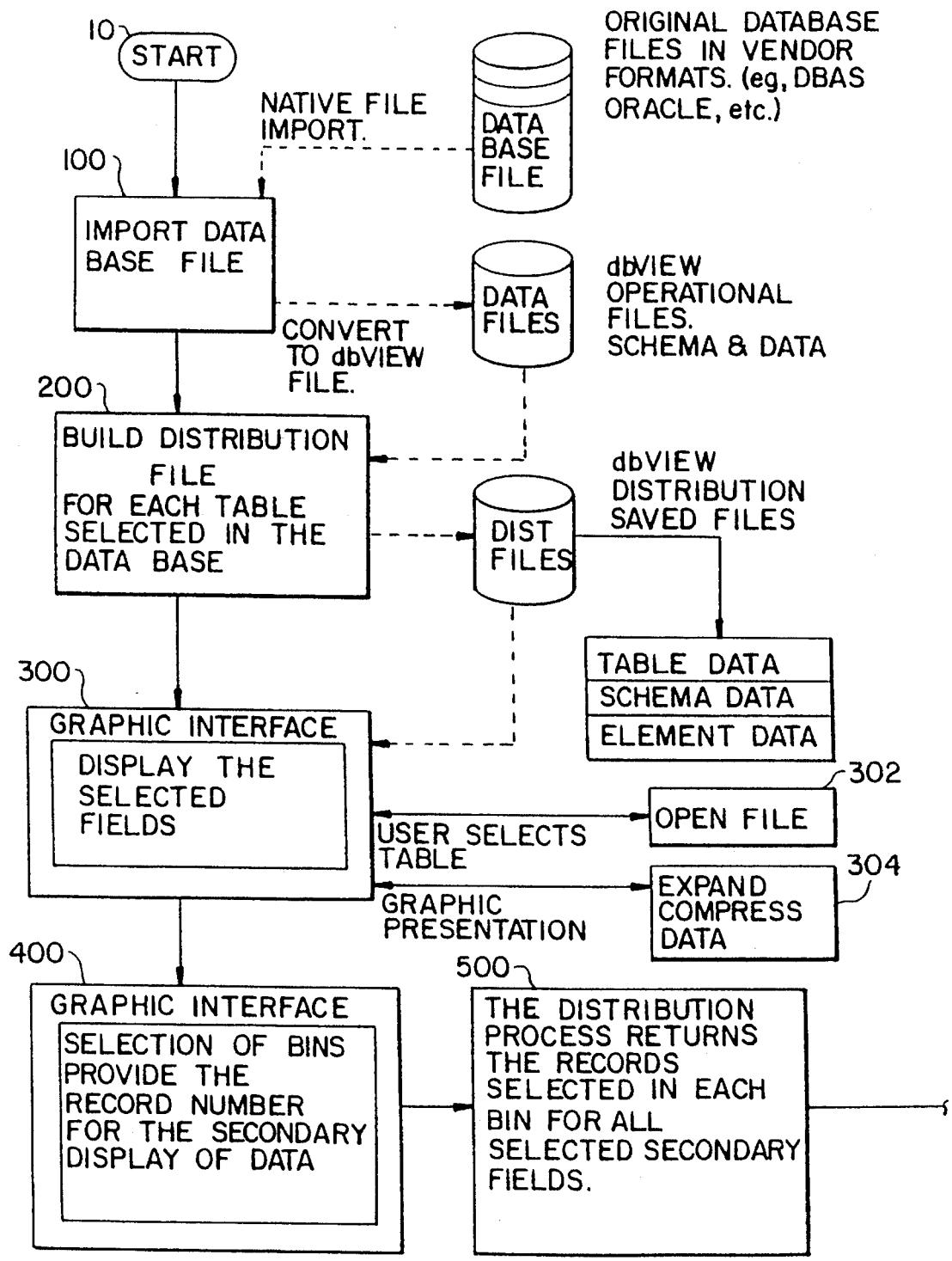
FIG. 1(a) is a first half of a high level flow chart representing the software necessary to implement the method for displaying and selecting the distribution of all data fields in a selected database of the present invention.
Figure 1B:
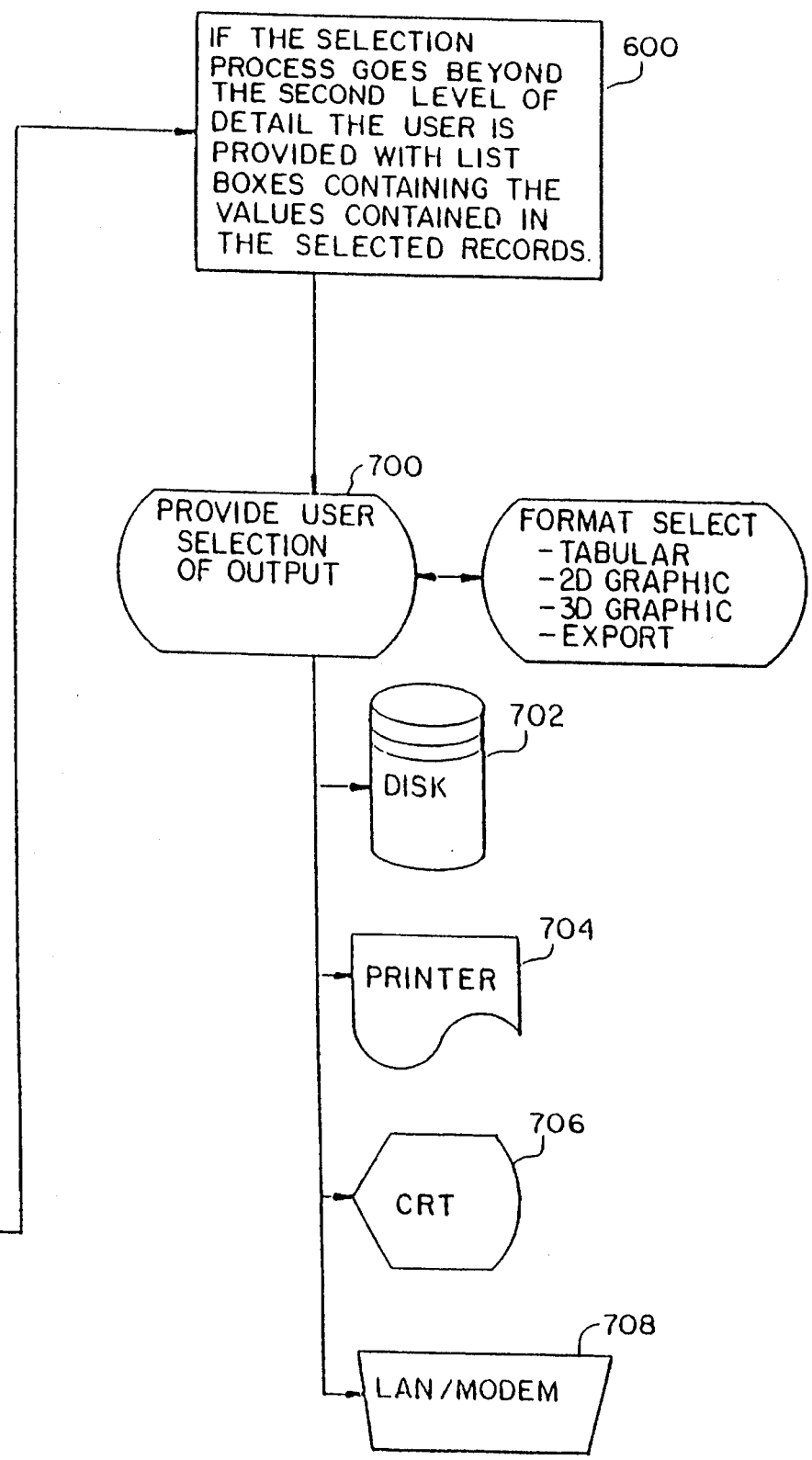
FIG. 1(b) is a second half of a high level flow chart representing the software necessary to implement the method for displaying and selecting the distribution of all data fields in a selected data base of the present invention.

Referring to FIG. 1, there is shown a high level flow chart representing the software necessary to implement the method for displaying and selecting the distribution of all data fields in a selected database. The flow chart of FIG. 1 illustrates the overall process for displaying and selecting the distribution of data fields, and as each element or block in the flow chart is described, reference to detailed flow charts and graphic figures are made to provide detailed information for each step in the overall process, and to illustrate the process itself. The entire software package is collectively known as dbEXPRESS™.

The entry point into the software routine is represented in the flow chart by element 10, which is simply the start or initialization point of the program. Element 100, which is the element directly following element 10, represents the software to implement the process of accessing a particular database from wherever the particular database is stored on the system. The databases may also be imported from Local Area Networks (LAN's), communication ports and from a variety of other areas. The databases that can be accessed are the original database files in vendor format that are resident on the particular system. The present invention, dbEXPRESS™, is a software tool for access and analysis of information across heterogeneous databases such as, but not limited to, Paradox and Oracle for micro-computers, Ingres and Sybase for mid-range computers, and DB2 and IMS for mainframe computers. Element 100 also represents the software necessary to convert the particular database file into dbEXPRESS™ operational, schema, and data files, from which the distribution is constructed.

Figure 2:
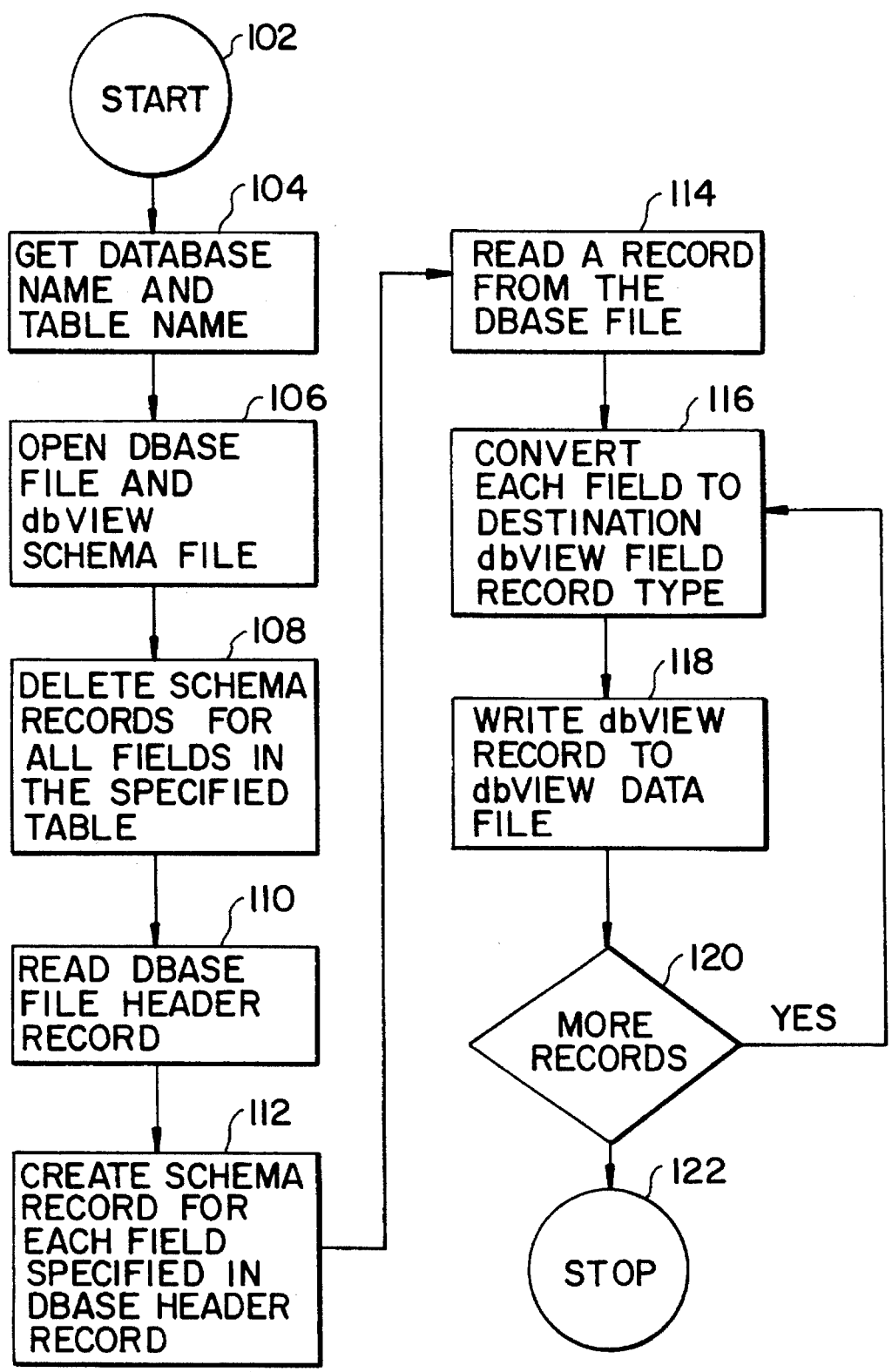
FIG. 2 is a detailed flow chart representing the database access software of the present invention.

FIG. 2 is the detailed flow chart of the database access routine illustrated in FIG. 1 as element 100. Element 102 is the point of entry into the database accessing routine. Element 104, which is the element directly following element 102, represents the software to implement the process step of retrieving the name of the particular database and the particular data tables within the particular database. The names are retrieved to access the data contained therein. The retrieval process is similar to indicating a path as utilized in DOS in the sense that the path names provide a way in which to access particular files. Element 106, which is the element directly following element 104, represents the software to implement the process step of opening the particular database so that the data can be read from the particular database and into dbEXPRESS™. In addition, element 106 represents the software to implement the process step of opening the internal setup or schema of dbEXPRESS™ so that the data from the database may be accurately and efficiently transferred into dbEXPRESS™. Element 108 which is the element directly following element 106, represents the software to implement the process step of eliminating the database schema so that only the raw data remains. This software deletes the schema records for all fields in the specified tables in the database and exposes the data so that it may be easily read into dbEXPRESS™. Element 110, which is the element directly following element 108, represents the software to implement the process step of reading in the information or parameters contained in the tables which comprise the database. This information is contained in the file headers of the database, and will be utilized further along in the process. Element 112, which is the element directly following element 110, represents the software to implement the process step of creating the dbEXPRESS™ schema record for each field specified in the file headers of the database. This software routine creates a layout of what is to be done with the specific data contained in the selected tables of the database. The layout provides a method of maintaining a reference between what the format of the data as it was stored in the original database to what it was converted to. The layout is maintained because the system user may want to export the dbEXPRESS™ files into an external file within the database while maintaining the dbEXPRESS™ format. Thus far in the database accessing process, the data contained in the particular database has been opened so that it can be read into dbEXPRESS™ memory, and a dbEXPRESS™ schema has been created based upon the information contained in the file header. Element 114, which is the element directly following element 112, represents the software to implement the process step of reading a data record from the exposed or raw data into the allocated memory area of dbEXPRESS™. Element 116, which is the element directly following element 114, represents the software to implement the process step of converting the data from the database into destination dbEXPRESS™ field record types. No matter the type of data collected, whether it be floating point or alphanumeric, it is converted into true numeric data. For example, if the data in the database is dates of the year represented in ASCII, then the process implemented by element 116 converts the ASCII representations of the dates into dbEXPRESS™ representations of the dates. It is important to note that this data is stored or located in program memory space and not computer system memory where the data would be stored as binary data. The data is converted into true numeric data because true numeric data can be manipulated at a much faster rate than any other type or form of data. Element 118, which is the element directly following element 116, represents the software to implement the process step of writing the dbEXPRESS™ records into dbEXPRESS™ data files. This step is a simple reorganizing and compression procedure which allows for the convenient storage of the data. Element 120, which is the element directly following element 118, represents the software to implement the process step of implementing a more records decision loop. If there are more records to process, then this software transfers processing back to element 116 so that the next set of data can be converted into destination dbEXPRESS™ field record types. If there are no more records to process, then this software routine is exited and the software represented by element 122 is then processed. Element 122 represents the software necessary to terminate the processing of the access database software and return control to the main software routine illustrated in FIG. 1.

The next block of software in the overall process which is shown in FIG. 1 is element 200 which represents the software to implement the process of building the distribution file or matrix for each table selected in the particular database. Element 200 represents a block of software that comprises a plurality of distribution algorithms which vary for each data type utilized in the particular database selected. For example, two different distribution procedures would be utilized for integer and floating point data types. However, the overall distribution building process consists of eight essential steps and can be summarized as follows:

(1) Determine the number of bins to use for the particular database.

(2) Find the minimum and the maximum values for each field.

(3) Determine the deltabin value.

(4) Fill in the field header values.

(5) Assign matrix work areas.

(6) Process the records to build the distribution matrix.

(7) Compress the matrix for this field.

(8) Process all fields in the records contained in the current and relational databases.

As stated previously, the primary functions of this distribution is to allow the user to view the data content of the file in a graphical format. The underlying method provides for accessing and displaying the number of records that fall into a given bin and for finding which database records are associated with the bin values. A bin is simply a specifically allocated area of memory.

Figure 3:
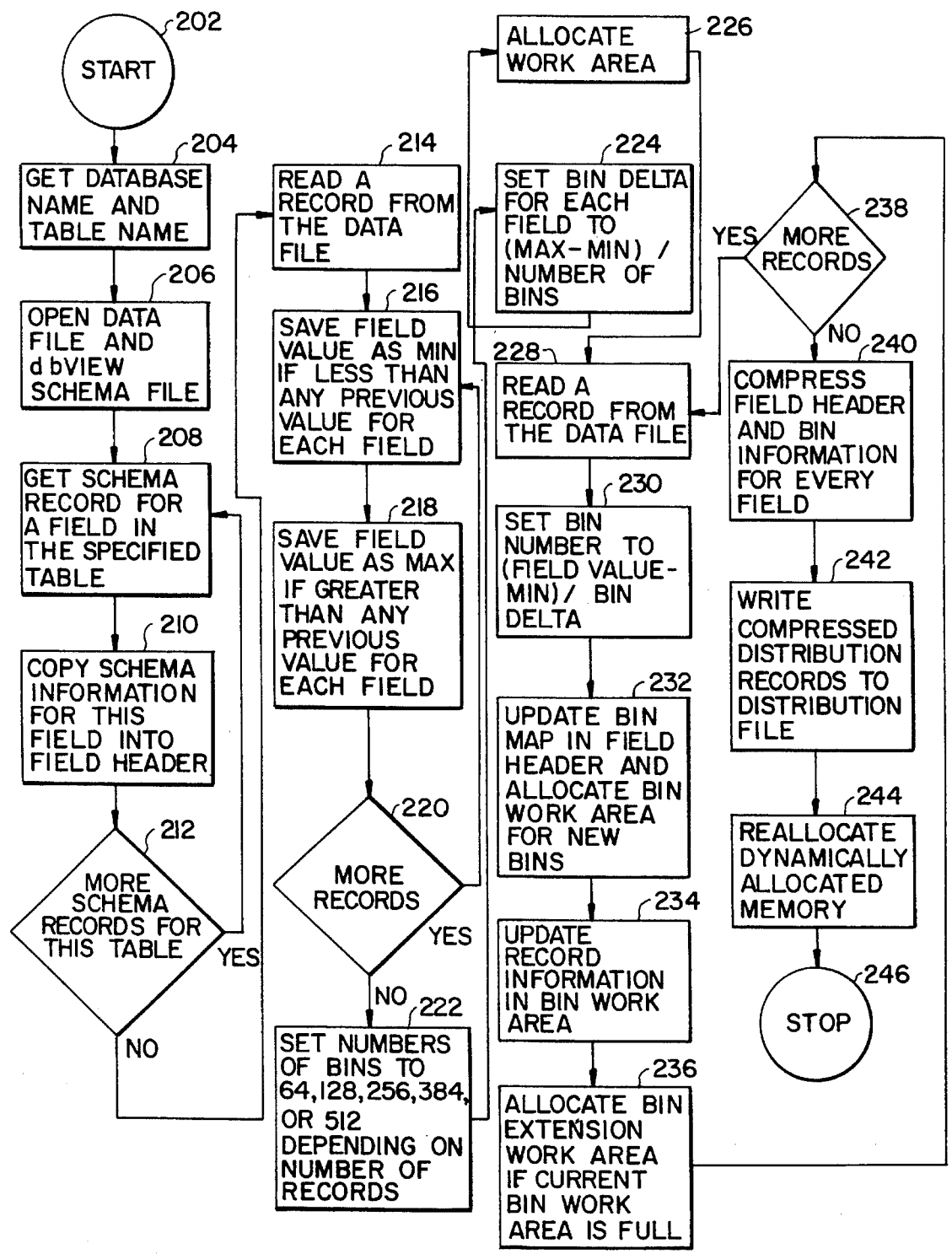
FIG. 3 is a detailed flow chart representing the distribution construction software of the present invention.

FIG. 3 is the detailed flow chart of the distribution construction routine illustrated in FIG. 1 as element 200. Element 202 is the point of entry into the distribution construction routine. Element 204, which is the element directly following element 202, represents the software to implement the process of retrieving the names of the particular database and the particular data tables within the particular database. As indicated previously, the name of the particular database and tables contained therein are retrieved in order to access the data contained in these files. However, describing this process as a simple retrieval of names is somewhat misleading. The software represented by element 204 is utilized to establish a link to the particular database rather than just simply retrieving names. Element 206, which is the element directly following element 204, represents the software to implement the process step of opening the particular database so that the data can be read from the particular database and into dbEXPRESS™. In addition, element 206 represents the software to implement the process step of opening the internal setup or schema of dbEXPRESS™ so that the data from the database may be accurately transferred into dbEXPRESS™. Element 208, which is the element directly following element 206 and represents the software to implement the process step of retrieving the dbEXPRESS™ schema record created for each field specified in the file header of the database. The schema records are created by the software represented by element 112 in the flow chart of FIG. 2. Element 210, which is the element directly following element 208, represents the software to implement the process step of copying certain information contained in the dbEXPRESS™ schema records directly into the field header for the distribution matrix under construction. The information copied includes the field name and the distribution type such as floating point or alphanumeric. The entire field header structure is discussed in subsequent paragraphs with reference to a figure illustrating the actual layout of the header. Element 212, which is the element directly following element 210, represents the software to implement the process step of determining if there are more schema records for this table. If there are more schema records for a particular table then this software transfers processing back to element 208 so that the next schema record for the particular table can be retrieved. If there are no more schema records for the particular table then this software transfers processing to the software represented by element 214.

At this point in the processing, the data contained in the records has been readied for further processing. The data and the information from various calculations utilizing the data is now utilized to construct the distribution tables for a given table. Element 214, which is the element directly following element 212, represents the software to implement the process step of reading in a record from the dbEXPRESS™ data file. Recall that the dbEXPRESS™ data files were created by writing the dbEXPRESS™ records to the dbEXPRESS™ data files by the software represented by element 118 shown in FIG. 2. The reading in of the dbEXPRESS™ records is repeated for all records in a particular field as part of a decision loop. As each record is read, the field values comprising the particular record are evaluated to determine the maximum field value and the minimum field value and which record corresponds to the minimum and maximum field values respectively. This part of the distribution construction process is accomplished be elements 216, 218, and 220. Element 216, which is the element directly following element 214, represents the software to implement the process step of determining the minimum field values as each record is read from the dbEXPRESS™ data file. This software process is a simple procedure which saves a field value as the minimum field value if the value is less than the previous field value. Element 218, which is the element directly following element 216, represents the software to implement the process step of determining the maximum field value as each record is read from the dbEXPRESS™ data file. This software process is a simple procedure which saves a field value as the maximum field value if the value is greater than the previous field value. Element 220, which is the element directly following element 218, represents the software to implement the process step of determining if there are more records to process. If there are more records in the dbEXPRESS™ data file then this software transfers processing back to element 214 so that the next record for can be retrieved. If there are no more records then this software transfers processing to the software represented by element 222.

FIG. 4 illustrates an example table or sample utilizing eleven records. The field values corresponding to the eleven records were read from the dbEXPRESS™ data files in the order shown in the figure. These numbers are used to illustrate how the distribution tables are to be constructed. As can be seen by simple inspection of the figure, the minimum field value, MINV, is 7.9, and the maximum field value, MAXV, is 23.2. In actuality MINV and MAXV are determined by the simple process described above, and not by inspection. The actual physical layout of the data is not as shown in FIG. 4; however, FIG. 4 provides a convenient format for illustrating the distribution construction process.

Referring back to FIG. 3, element 222, which is the element directly following element 220, represents the software to implement the process step of determining the number of bins to use for the database. This software sets the number of bins to 64, 128, 256, 512, or equal to the number of records present. The number 512 is not an upper limit, for example, if increased display resolution is desired the number of bins may be increased to meet user requirements. In this example, the number of bins is set to 11 because there are 11 records. This example represents the simplest implementation of dbEXPRESS™; however, in actuality, the number of bins can vary with the desired level of resolution as stated above. Element 224, which is the element directly following element 222, represents the software to implement the process step of calculating the DELTABIN value, which is the value to be assigned to each bin, and to assign the bin ranges. The minimum and maximum data values and the DELTABIN value are saved in the field header structure, which is described subsequently. The DELTABIN value is calculated by the software by utilizing the formula given by $$(MAXV-MINV)/\# \text{ of bins}=DELTABIN. \quad (1)$$

The software has already determined the minimum and maximum values as well as the setting of the number of bins; therefore, substituting in the values for MAXV, MINV, and the # of bins results in a DELTABIN equal to $$DELTABIN=(23.2-7.9)/11=1.39. \quad (2)$$

Once the DELTABIN value is calculated by this block of software utilizing equation (1), the bin ranges are determined or assigned by the software by breaking up the range of values, 7.9 to 23.2, in DELTABIN value increments, and assigning them to bins in ascending order. The bin numbers and their respective ranges are shown in FIG. 5. The bin range assignments are a calculated value and are not saved as array elements. FIG. 5 is for reference purposes only. The use of these bin ranges will become apparent shortly.

Figure 6:
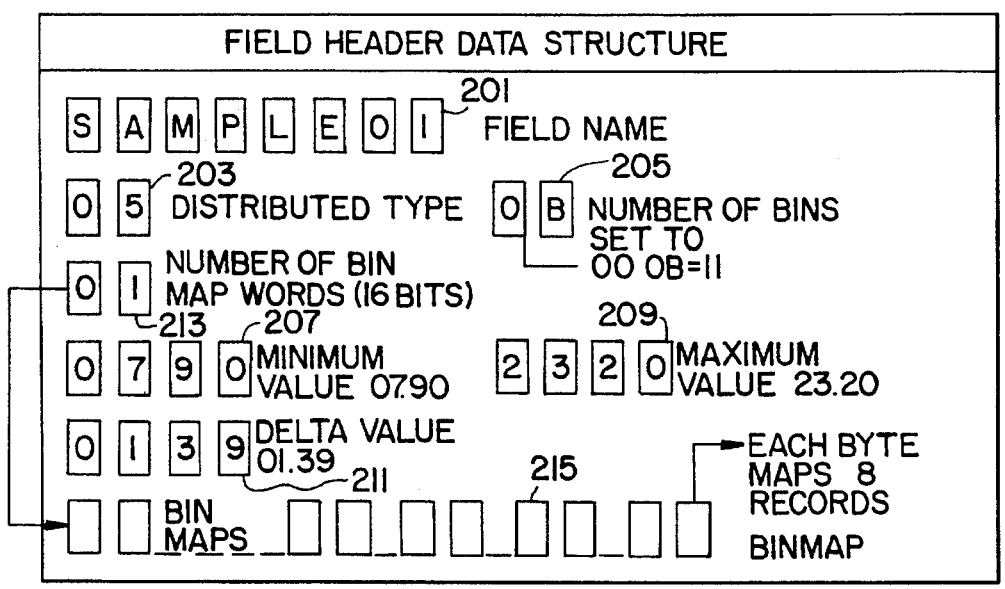
FIG. 6 is a diagrammatic representation of a sample field header data structure utilized in the present invention.

The next step in the distribution construction process is the step of filling in the field header values. As the various information is determined or calculated by the process steps represented in FIG. 3, it is eventually stored in the field header data structure. FIG. 6 illustrates the basic field header structure. Area 201 is the field name and is filled in by the software process step represented by element 210 of FIG. 3.

For purposes of this particular example, the field name is chosen to be SAMPLE01. Area 203 is the distribution type field and contains a two digit code indicative of the particular type of data contained in the data file, i.e. floating point type data. In this example a distribution type of 5 is utilized and shall denote that the field data are floating point values. Area 203, like area 201 is filled in by the software process step represented by element 210. Area 205 is the number of bins field and contains the actual number of bins utilized for a given field. The number of bins is represented by a hexadecimal number, and in this case since there are eleven bins, hexadecimal B is placed into area 205. The number of bins is set by the software process step represented by element 222 of FIG. 3; therefore, it is directly copied into the field header. Area 207 is the minimum value field and area 209 is the maximum value field. These two fields contain MINV and MAXV respectively, which were determined by the software process steps represented by elements 216 and 218 respectively. Accordingly, area 207 contains 7.90 and area 209 contains the value 23.20, both of which are represented by floating point numbers. Area 211 is the delta value field and contains the DELTABIN value calculated by the software process step represented by element 224 of FIG. 3; therefore the number 1.39 is placed there and is represented as a floating point number. Area 213 is the number of bin map words field and contains the number of bin map words utilized. Since the number of bins in this example is set at eleven, only one bin map word will be required. The value of this entry is therefore one. Area 215 is the bin map area and is utilized to show which particular bins are active. Since there are only eleven bins, a single 16 bit word is needed to show the active bins. This area is filled in as the distribution construction process continues.

At this point in the distribution construction process, the number of bins to use for the database has been determined, the minimum and maximum values of the field have been determined, the DELTABIN value has been calculated and the header values have been filled in to their respective areas. The program will now assign work areas for the distribution matrix build. As the matrix is built the work area segments will be expanded on an as needed basis. Upon completion of the distribution construction phase the matrix will be compressed in preparation for the operational phase.

Figure 7:
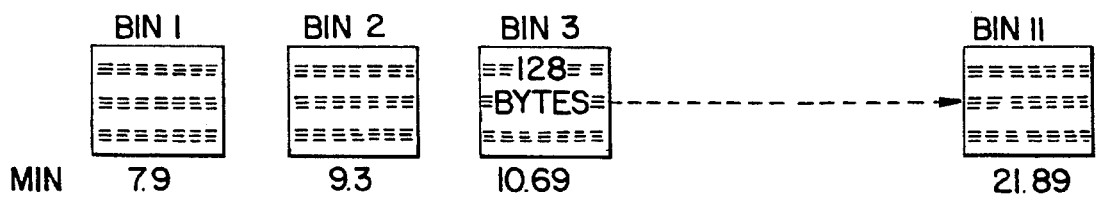
FIG. 7 is a block diagram representation of the matrix work areas of the present invention.

Referring back to FIG. 3, the next step in the process is assigning the matrix work areas. Element 226, which is the element directly following element 224, represents the software to implement the process step of allocating a block of work space for each assigned bin. FIG. 7 graphically illustrates how the memory is divided up for each bin. For each assigned bin the program will allocate a 128 byte block of work space. For this particular example, FIG. 7 illustrates the 128 bytes of work space for each of the eleven bins. Table 1 given below contains a listing of the terms or words which comprise the structure of these matrix work areas. The meaning of the words listed in Table 1 shall be explained as the next step in the distribution construction process is explained.

TABLE 1

| WORD NO. | DESCRIPTION | MNEMONIC |
|---|---|---|
| 0 | THE ADDRESS OF THE PREVIOUS MATRIX BIN | RECBINFR |
| 1 | THE ADDRESS OF THE EXTENDED MATRIX BUILD AREA | RECBINTO |
| 2 | NUMBER OF RECORDS | RECBINNO |

TABLE 1-continued

| WORD NO. | DESCRIPTION | MNEMONIC |
|---|---|---|
| 3 | CONTAINED IN THIS BIN NUMBER OF RECORD BIT MAP WORDS | RECMAPNO |
| 4(1st) | STARTING RECORD NUMBER (NEGATED) | RECSTRNO |
| 5(1st) | BIT MAP WORDS - (POSITIVE ONLY), THE SIGN BIT MUST BE ZERO. THIS BIT MAP WORD ALLOWS THE BIT MAPPING OF THE NEXT 15 RECORDS AFTER RECSTRNO | RECMAPWD |

The next step in the distribution construction process is the processing of the collected records to actually build the distribution matrix. Element 228 in FIG. 3 represents the first block of software in this phase of the process. Element 228, which is the element directly following element 226, represents the software to implement the process step of reading in a record from the dbEXPRESS™ data file. Accordingly, the software now determines the bin number to update based upon the range for each bin as indicated in FIG. 5. Element 230, which is the element directly following element 228, represents the software to implement the process step of determining the correct bin number. The software represented by this block utilizes the formula given by $$\text{BIN value} = |\text{field value} - \text{BIN MIN}/\text{DELTABIN}|, \quad (3)$$

wherein the field value and BIN MIN are for the particular record being read at that instant. In addition, the resultant value from equation (3) is rounded up to the nearest whole number. The calculation for the bin number must conclude with the BIN value being set to an absolute value as indicated in the equation. This will take into account the occurrence of negative values. Element 232, which is the element directly following element 230, represents the software to implement the process step of updating the bin map area in the field header, area 215 in FIG. 6, to indicate that a particular bin is active. Element 234, which is the element directly following element 232, represents the software to implement the process step of updating the information in a particular bin work area. This software is responsible for calculating the values of the words listed in Table 1. Element 236, which is the element directly following element 234, represents the software to implement the process step of allocating an extended work area if the current bin work area is larger than 128 bytes. Element 238, which is the element directly following element 236, represents the software to implement the process of determining if there are more records to process. If there are more records to process, then this software transfers processing back to element 228 so that the next record can be read in from the dbEXPRESS™ data file. If there are no more records, then this software transfers processing to the software represented by element 240.

Figure 8:
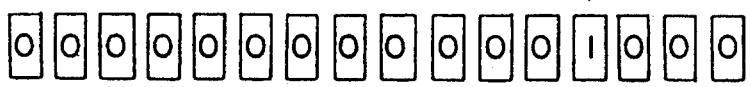
FIG. 8 is a diagrammatic representation of the distribution matrix for record number 1.

To clarify the above process, the procedure is explained with reference to a series of figures which utilize the example values given previously. FIG. 8 depicts the processing procedure for record number 1. The record is read from the dbEXPRESS™ data file by the software represented by element 228 in FIG. 3. For this particular record, the software process step represented by element 230 utilizes equation (3) to determine the bin number. Substituting in the proper values into equation (3) results in a BIN value given by $$\text{BIN Value} = |(12.7-7.9)/1.39| = 3.45 = 4, \quad (4)$$

since the number is rounded up to the nearest whole number. Accordingly, the bit corresponding to bin 4 is set in the binmap word in the header. Word 0 in the matrix work area is the address of the previous matrix bin, RECBINFR, and is used if more than 128 bytes of memory is required for a given bin. In this example, 128 bytes is more than sufficient. Word 1 in the matrix work area is the address of the extended matrix build area, RECBINTO, and it is only utilized when any additional memory is required. Accordingly, Word 0 and Word 1 remain at there initial values of 0. Word 2, is the number of records contained in this bin, RECBINNO. In this example, and at this point in the processing, bin 4 contains one record, record 1, with a value of 12.7. Word 3, is the number of record bit map words, RECMAPNO. This value is initialized to 5 and is updated as more words are utilized. Word 4, is the starting record number, RECSTRNO. This word indicates the specific record number currently being processed and is represented as a negative number. In this case, since the process is on record 1, RECSTRNO is set to −1. Word 5 is the bit map words, RECMAPWD. This word allows the bit mapping of the next 15 records after RECSTRNO. Its use is explained as a description of the next 10 records is given.

Figure 9:
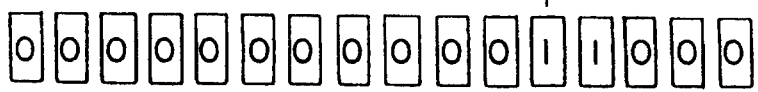
FIG. 9 is a diagrammatic representation of the distribution matrix for record number 2.

FIG. 9 depicts the processing procedure for record number 2. Once again the record is read from the dbEXPRESS™ data file by the software process step represented by element 228 in FIG. 3. The software process step represented by element 230 utilizes equation (3) to determine the correct bin number, which in this case is bin 5. Accordingly, the bit corresponding to bin 5 is Set in the binmap word in the header. Word 0 and Word 1 remain at there initial values of 0 since more memory space is not needed. Word 2, is the number of records contained in this bin, and since bin 5 contains one record, record 2, with a value of 14.8, Word 2 is set to a value of 1. Word 3, is the number of record bit map words, and remains at the initialized value of 5. Word 4, is the starting record number, and in this case since the process is currently working on record 2, RECSTRNO is set to −2. Word 5 is not used at this point in the processing.

FIG. 10 depicts the processing procedure for record number 3. Once again the record is read from the dbEXPRESS™ data file by the software process step represented by element 228 in FIG. 3. The software process step represented by element 230 utilizes equation (3) to determine the correct bin number, which in this case is bin 8. Accordingly, the bit corresponding to bin 8 is set in the binmap word in the header. Word 0 and Word 1 remain at there initial values of 0 since more memory space is not needed. Word 2, is the number of records contained in this bin, and since bin 8 contains one record, record 3, with a value of 17.9, Word 2 is set to a value of 1. Word 3, is the number of record bit map words, and remains at the initialized value of 5. Word 4, is the starting record number, and in this case since the process is currently working on record 3, RECSTRNO is set to −3. Word 5 is not used at this point in the processing.

FIG. 11 depicts the processing procedure for record number 4. Once again the record is read from the dbEXPRESS™ data file by the software process step represented by element 228 in FIG. 3. The software process step represented by element 230 utilizes equation (3) to determine the correct bin number, which in this case is bin 11. Accordingly, the bit corresponding to bin 11 is set in the binmap word in the header. Word 0 and Word 1 remain at there initial values of 0 since more memory space is not needed. Word 2, is the number of records contained in this bin, and since bin 11 contains one record, record 4, with a value of 22.4, Word 2 is set to a value of 1. Word 3, is the number of record bit map words, and remains at the initialized value of 5. Word 4, is the starting record number, and in this case since the process is currently working on record 4, RECSTRNO is set to −4. Word 5 is not used at this point in the processing.

FIG. 12 depicts the processing procedure for record number 5. Once again the record is read from the dbEXPRESS™ data file by the software process step represented by element 228 in FIG. 3. The software process step represented by element 230 utilizes equation (3) to determine the correct bin number, which in this case is bin 11 again. Since the bit corresponding to bin 11 is already set in the binmap word in the header, there is no need to set it again. Word 0 and Word 1 remain at there initial values of 0 since more memory space is not needed. Word 2, is the number of records contained in this bin, and since this is the second record in bin 11, record 5, with a value of 22.4, Word 2 is set to a value of 2. Word 3, is the number of record bit map words, and is set to a value of 6 because Word 5 is now going to be utilized. Word 4, is the starting record number for this particular bin and it remains the same as it was for processing record 4 because the first record in bin 11 is still record 4. Word 5 is set to a value of 0001. As was stated previously, this number allows the bit mapping of the next 15 records after RECSTRNO. Therefore, the value 0001 is utilized to indicate record 5 because 0001 is the first position after record 4 which is indicated by the value of RECSTRNO. The previous values for Words 0 through 5 are shown in the figure; however, only the second column would be saved if there were no more records.

FIG. 13 depicts the processing procedure for record number 6. Once again the record is read from the dbEXPRESS™ data file by the software process step represented by element 228 in FIG. 3. The software process step represented by element 230 utilizes equation (3) to determine the correct bin number, which in this case is bin 4 again. Since the bit corresponding to bin 4 is already set in the binmap word in the header, there is no need to set it again. Word 0 and Word 1 remain at there initial values of 0 since more memory space is not needed. Word 2, is the number of records contained in this bin, and since this is the second record in bin 4, record 6, with a value of 12.7, Word 2 is set to a value of 2. Word 3, is the number of record bit map words, and is set to a value of 6 because Word 5 is now going to be utilized. Word 4, is the starting record number for this particular bin and it remains the same as it was for processing record 1 because the first record in bin 4 is still record 1. Word 5 is set to a value of 0010. The value 0010 is utilized to indicate record 6 because 0010 is the fifth position after record 1 which is indicated by the value of RECSTRNO. Once again, the previous values for Words 0 through 5 are shown in the figure; however, only the second column would be saved if there were no more records.

FIG. 14 depicts the processing procedure for record number 7. Once again the record is read from the dbEXPRESS™ data file by the software process step represented by element 228 in FIG. 3. The software process step represented by element 230 utilizes equation (3) to determine the correct bin number, which in this case is bin 4 again. Since the bit corresponding to bin 4 is already set in the binmap word in the header, there is no need to set it again. Word 0 and Word 1 remain at there initial values of 0 since more memory space is not needed. Word 2, is the number of records contained in this bin, and since this is the third record in bin 4, record 7, with a value of 12.7, Word 2 is set to a value of 3. Word 3, is the number of record bit map words, and is set to a value of 6 because Word 5 is now going to be utilized. Word 4, is the starting record number for this particular bin and it remains the same as it was for processing record 1 because the first record in bin 4 is still record 1. Word 5 is set to a value of 0030. The value 0030 is utilized to indicate record 7 because 0030 is the sixth position after record 1 which is indicated by the value of RECSTRNO. Once again, the previous values for Words 0 through 5 are shown in the figure; however, only the third column would be saved if there were no more records.

FIG. 15 depicts the processing procedure for record number 8. Once again the record is read from the dbEXPRESS™ data file by the software process step represented by element 228 in FIG. 3. The software process step represented by element 230 utilizes equation (3) to determine the correct bin number, which in this case is bin 5 again. Since the bit corresponding to bin 5 is already set in the binmap word in the header, there is no need to set it again. Word 0 and Word 1 remain at there initial values of 0 since more memory space is not needed. Word 2, is the number of records contained in this bin, and since this is the second record in bin 5, record 8, with a value of 14.8, Word 2 is set to a value of 2. Word 3, is the number of record bit map words, and is set to a value of 6 because Word 5 is now going to be utilized. Word 4, is the starting record number for this particular bin and it remains the same as it was for processing record 2 because the first record in bin 5 is still record 2. Word 5 is set to a value of 0020. The value 0020 is utilized to indicate record 8 because 0020 is the sixth position after record 2 which is indicated by the value of RECSTRNO. Once again, the previous values for Words 0 through 5 are shown in the figure; however, only the second column would be saved if there were no more records.

FIG. 16 depicts the processing procedure for record number 9. Once again the record is read from the dbEXPRESS™ data file by the software process step represented by element 228 in FIG. 3. The software process step represented by element 230 utilizes equation (3) to determine the correct bin number, which in this case is bin 9. Accordingly, the bit corresponding to bin 9 is set in the binmap word in the header. Word 0 and Word 1 remain at there initial values of 0 since more memory space is not needed. Word 2, is the number of records contained in this bin, and since bin 9 contains one record, record 9, with a value of 19.7, Word 2 is set to a value of 1. Word 3, is the number of record bit map words, and remains at the initialized value of 5. Word 4, is the starting record number, and in this case since the process is currently working on record 9, RECSTRNO is set to −9. Word 5 is not used at this point in the processing.

FIG. 17 depicts the processing procedure for record number 10. Once again the record is read from the dbEXPRESS™ data file by the software process step represented by element 228 in FIG. 3. The software process step represented by element 230 utilizes equation (3) to determine the correct bin number, which in this case is bin 1. Accordingly, the bit corresponding to bin 1 is set in the binmap word in the header. Word 0 and Word 1 remain at there initial values of 0 since more memory space is not needed. Word 2, is the number of records contained in this bin, and since bin 1 contains one record, record 10, with a value of 7.9, Word 2 is set to a value of 1. Word 3, is the number of record bit map words, and remains at the initialized value of 5. Word 4, is the starting record number, and in this case since the process is currently working on record 10, RECSTRNO is set to −10. Word 5 is not used at this point in the processing.

FIG. 18 depicts the processing procedure for record number 11. Once again the record is read from the dbEXPRESS™ data file by the software process step represented by element 228 in FIG. 3. The software process step represented by element 230 utilizes equation (3) to determine the correct bin number, which in this case is bin 1 again. Since the bit corresponding to bin 1 is already set in the binmap word in the header, there is no need to set it again. Word 0 and Word 1 remain at there initial values of 0 since more memory space is not needed. Word 2, is the number of records contained in this bin, and since this is the second record in bin 1, record 11, with a value of 8.6, Word 2 is set to a value of 2. Word 3, is the number of record bit map words, and is set to a value of 6 because Word 5 is now going to be utilized. Word 4, is the starting record number for this particular bin and it remains the same as it was for processing record 10 because the first record in bin 1 is still record 10. Word 5 is set to a value of 0001. The value 0001 is utilized to indicate record 11 because 0001 is the first position after record 10 which is indicated by the value of RECSTRNO. Once again, the previous values for Words 0 through 5 are shown in the figure; however, only the second column would be saved if there were no more records.

Figure 20:
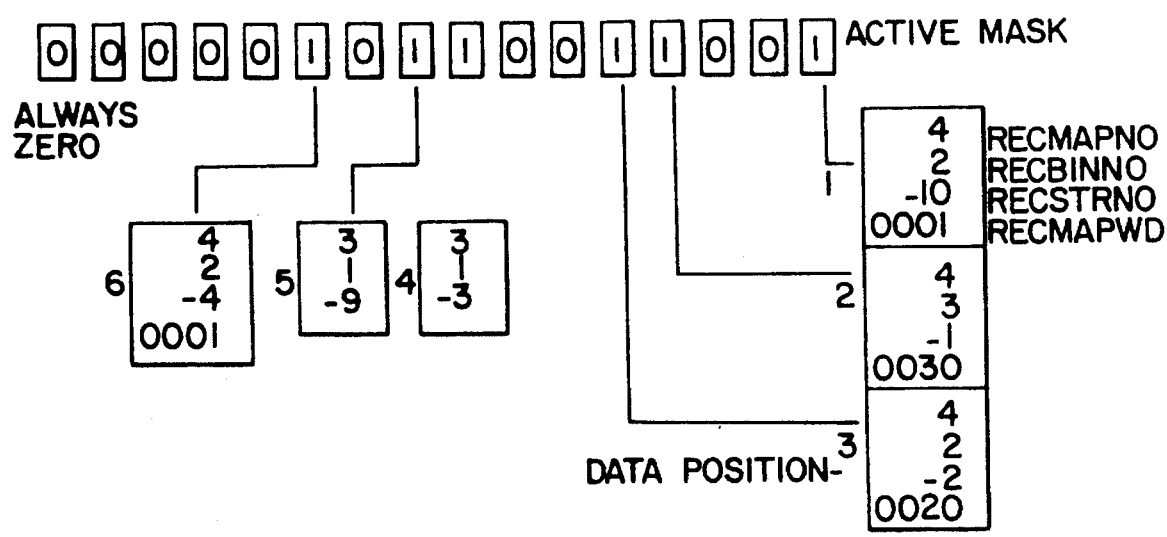
FIG. 20 is a tabular representation of the compressed final data content of the BIN work area.

The next step in the distribution building process is the compression of the field header information and the information for every field. As stated previously, the original allocation of memory was in 128 byte blocks. The purpose of this step is to eliminate unused space from the distribution matrix. Referring back to FIG. 3 once again, element 240, which is the element directly following element 238, represents the software to implemented the process step of compressing the data. The software basically just eliminates the unused spaces of memory. FIG. 19 represents the final data content of the bin work area as created from the final values, i.e. last column of values, from FIGS. 8 through 18. The compression process removes the record link words, RECBINFR and RECBINTO, by adjusting RECMAPNO, which is the number of words in the bin matrix. The data is then compressed into a contiguous block of memory as shown in FIG. 20. Element 242, which is the element directly following element 240, represents the software to implement the process step of writing the compressed distribution records to the distribution file where it can be utilized for display purposes as illustrated in the bar chart of FIG. 23, which is explained in subsequent paragraphs. The entire display procedure is also explained in subsequent sections. Element 244, which is the element directly following element 242, represents the software to implement the process step of deallocating the memory utilized to build the matrix distributions. The final step in the distribution building process is the processing of all fields in the records contained in the current and relational databases. This means that the entire process is repeated until all fields are processed. Element 246, which is the element directly following element 244, represents the software to implement the process step of terminating the distribution building process and return processing control to element 300 in FIG. 1.

The next block of software in the overall process which is shown in FIG. 1 is element 300 which represents the software to implement the process of graphically displaying the selected fields for which the distribution matrix was built. This software is for the primary display of the records for selected fields. The graphical display is accomplished utilizing a variety of graphical display formats including bar charts, line charts, scatter representations, pie charts and nyquest curves. The software includes two basic steps. The first step in the process is opening a specific dbEXPRESS™ file for display and is represented by element 302 in FIG. 1. The second step in the process is expanding the compressed data contained in the particular dbEXPRESS™ data file so that it can be displayed, and is represented by element 316 in FIG. 1. The software process represented by element 302 is further described with reference to the flow chart of FIG. 21 and the software process represented by element 316 is further described with reference to the flow chart of FIG. 22. In addition, figures illustrating the types of primary displays are also described.

Figure 21:
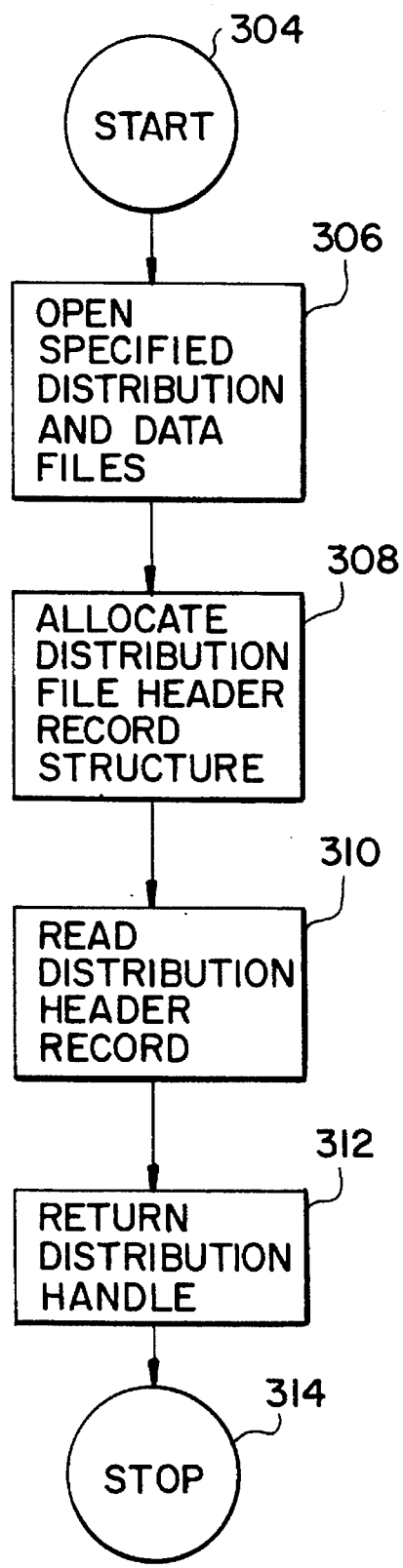
FIG. 21 is a detailed flow chart representing the file opening software of the present invention.

Referring now to FIG. 21, there is shown a detailed flow chart representing the software process to implement the dbEXPRESS™ file opening software. Element 304 is the point of entry into the dbEXPRESS™ file opening routine. Element 306, which is the element directly following element 304, represents the software to implement the process step of opening the specified distribution and data files so that the particular files can be accessed. Element 308, which is the element directly following element 306, represents the software to implement the process step of allocating the distribution file header record structure. This software simply reserves a block of memory for the required information to be displayed because of the unknown size or quantity of the data contained therein. Element 310, which is the element directly following element 308, represents the software to implement the process step of reading the information stored in the distribution file header record. Recall that the file header contains such information as the field name, the distribution type and the number of bins utilized. Element 312, which is the element directly following element 310, represents the software to implement the process step of returning the distribution handle. This software is responsible for moving the pointer to a ready position so that the next display can be accomplished. The linkage for data table access is the distribution handle or pointer. Element 314, which is the element directly following element 312, represents the software to implement the process step of terminating processing of the opening routine and passes processing control back to the display software represented by element 300 in FIG. 1.

Figure 22:
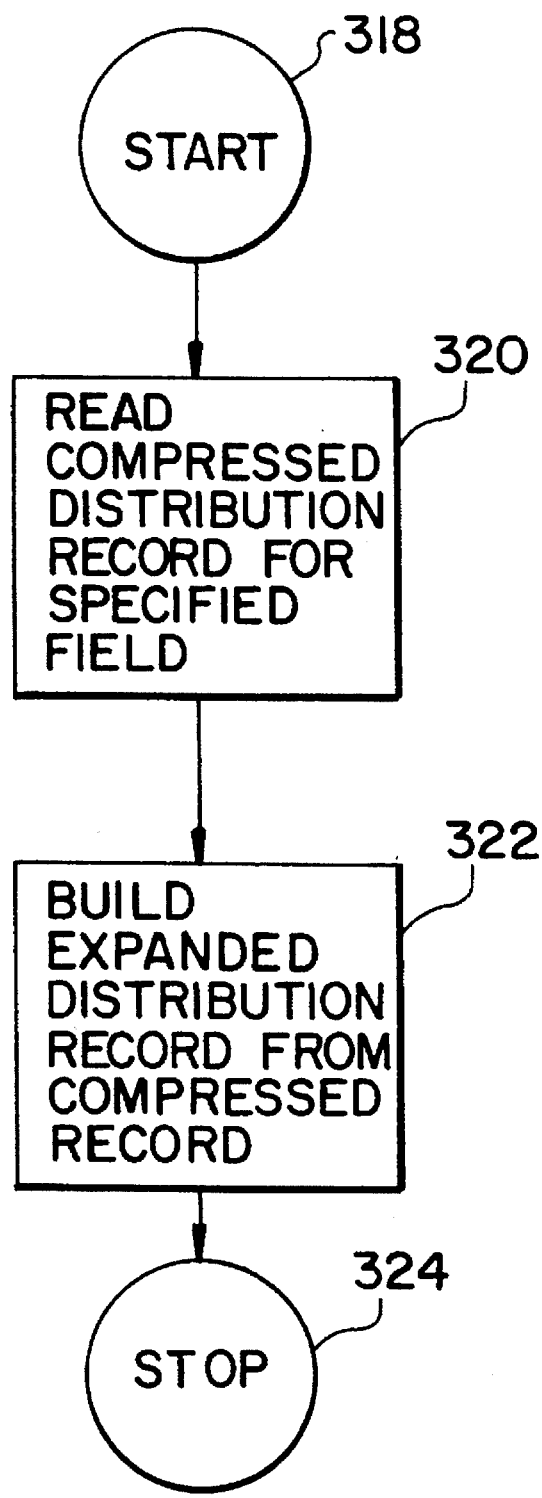
FIG. 22 is a detailed flow chart representing the data expansion software of the present invention.

Referring now to FIG. 22 there is shown a detailed flow chart representing the software process to implement the expansion of compressed data software. Element 318 is the point of entry in the expansion software. Element 320, which is the element directly following element 318, represents the software to implement the process step of reading the data contained in the compressed distribution record for the specified or selected field. The memory space was previously allocated by the software represented by element 308 in FIG. 21. Element 322, which is the element directly following element 320, represents the software to implement the process step of building and expanding a distribution record from the compressed record so that it can be properly displayed by the graphics software process represented by element 300 in FIG. 1. Element 324, which is the element directly following element 322, represents the software to implement the process step of terminating processing of the expansion routine and passes control back to the display software represented by element 300 of FIG. 1.

Figure 23:
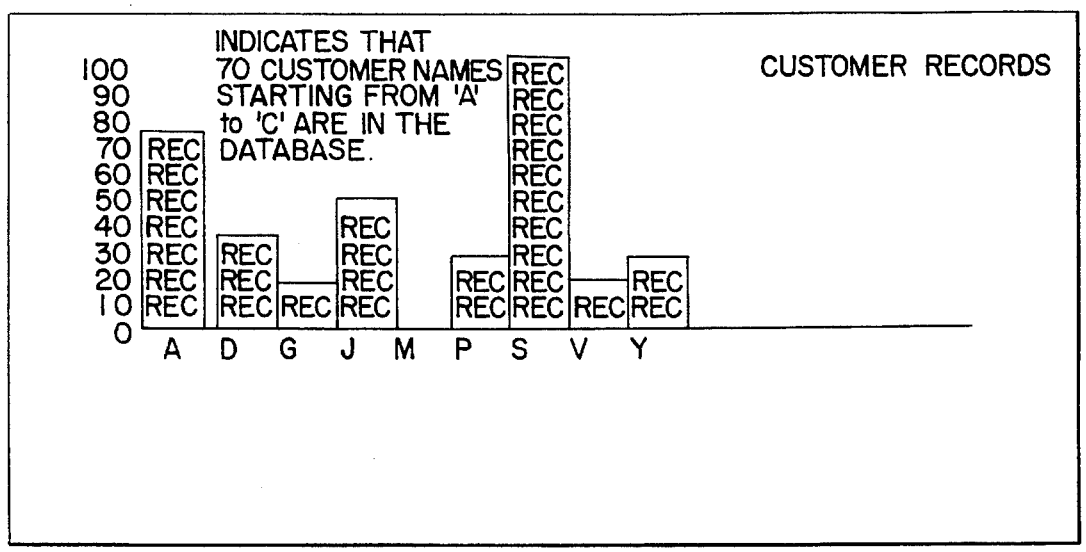
FIG. 23 is a sample primary graphical display output of the present invention.

FIG. 23 illustrates a graphical presentation of fictitious customer records, utilizing a bar chart display format, which provides an example of the graphical display of a distribution available to the user of this method. The bar charts in this figure represent a primary display of the distribution for all selected fields of customer records. In a primary display, the color of the background is grey and the bar chart showing the number of records is in red. The abscissa represents the first letter of the various customer names, and the ordinate represents the number of customers or customer records. Accordingly, the first bar in the chart indicates that there are 70 customer names starting with the letters A, B, or C in the database, the second bar indicates that there are 30 customer names starting with the letters D through F, the third bar indicates that there are 10 customer names starting with the letters G through I, the fourth bar indicates that there are 40 customer names starting with the letters J through L, the fifth bar indicates that there are 20 customer names starting with the letters P through R, the sixth bar indicates that there are 100 customer names starting with the letters S through U, the seventh bar indicates that there are 10 customer names starting with the letters V through X, and the eighth bar indicates that there are 20 customer names starting with the letters Y and Z.

FIG. 23 illustrates a primary graphical display of fictitious customer records and provides a basis for further description of the detailed selection and display process. Before the detailed selection and display process illustrated in FIGS. 26, and 29 through 32 is described, the functional relationship between a primary graphical display and the distribution matrix from which it was generated will be described with respect to FIGS. 20 and 24.

Figure 24:
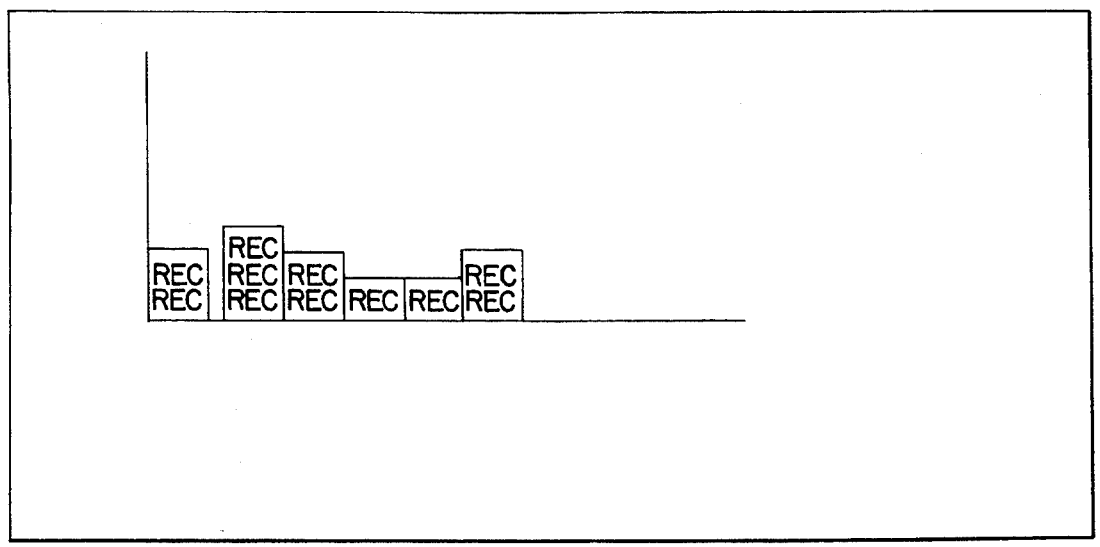
FIG. 24 is a primary graphical display of the SAMPLE01 records output of the present invention.

FIG. 24 illustrates a primary graphical display generated from the compressed distribution matrix represented in FIG. 20. In bin 1, RECBINNO, which is the number of records contained in the particular bin is equal to 2, accordingly the first bar in FIG. 24 shows that there are two records. Recalling FIG. 5, bin 1 contains or represents record data ranging in value from 7.90 to 9.29; therefore, the ordinate in the display of FIG. 24 shows two records, whatever they may represent, having values which are in a range of between 7.90 and 9.29 in the particular database which has been accessed. In bin 4, as shown in FIG. 20, RECBINNO is equal to 3, accordingly, the second bar in FIG. 24 shows that there are three records within the specified range. The range of record data in this particular bin, as shown in FIG. 5, is between 12.09 and 13.48. In bin 5, RECBINNO is equal to 2, accordingly, the third, bar in FIG. 24 shows that there are two records within the specified range. The range of record data in this particular bin, as shown in FIG. 5, is between 13.49 and 14.88. In bin 8, RECBINNO is equal to 1, accordingly, the fourth bar in FIG. 24 shows that there is one record within the specified range. The range of record data in this particular bin 1 as shown in FIG. 5, is between 17.69 and 19.08. In bin 9, RECBINNO is equal to 1, accordingly, the fifth bar in FIG. 24 shows that there is one record within the specified range. The range of record data in this particular bin is 19.09 to 20.48. In bin 11, RECBINNO is equal to 2, accordingly, the sixth and final bar in FIG. 24 shows that there are two records within the specified range. The range of data in this particular bin, as shown in FIG. 5, is between 21.89 and 23.28. Each of the programs or software routines used to generate the graphical displays hereinafter illustrated and described with respect to FIGS. 25 through 32 utilize compressed distribution matrices to obtain data for the display in a manner similar to the way the program generated the graphical display in FIG. 24 from the compressed matrix illustrated in FIG. 20.

The actual data contained in the selected database is not necessary for a primary graphical display. The primary graphical display as well as the secondary graphical display provides a useful and informative method of viewing and/or studying the overall distribution of the data without being burdened with the actual data. As can be seen from FIG. 24, only the number of data records over specified ranges are illustrated, not the actual values. If and when actual data is needed, the system user simply requests a detail display, which is described and illustrated in subsequent paragraphs, and the actual data represented by the data records in the primary graphical display is displayed in a list box. The actual data is stored in system memory or extended system memory and is easily accessed as explained in the description of the detailed graphical display procedure.

Figure 25:
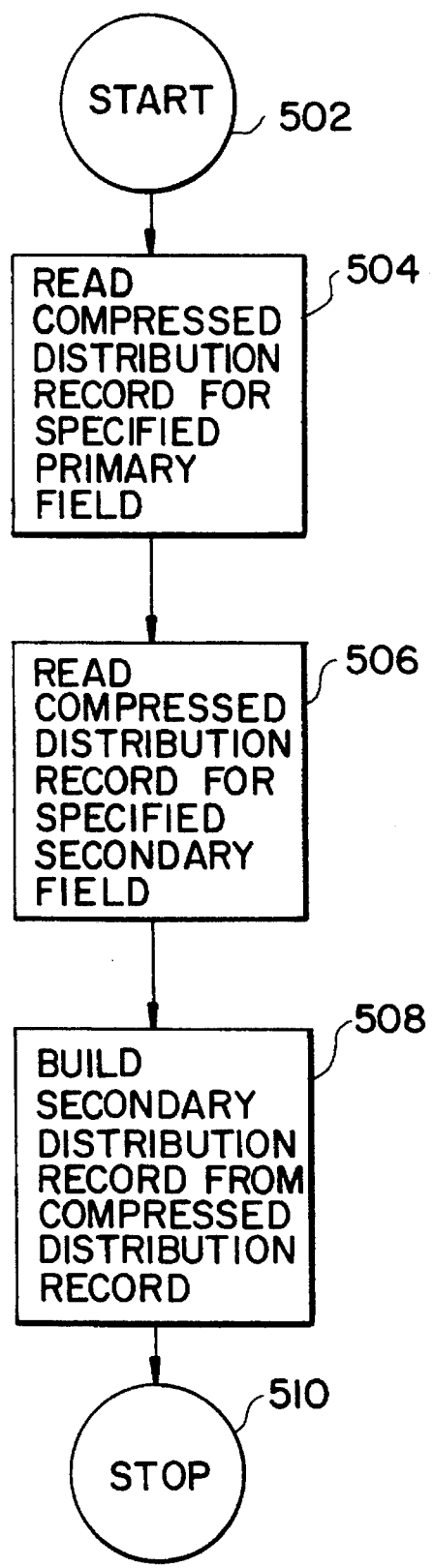
FIG. 25 is a detailed flow chart representing the secondary display software of the present invention.

Returning to the detailed description of FIG. 23, the user may now select any bar for detailed selection. A detailed selection represents a secondary display of the data. Element 400, which is the element directly following element 300 in FIG. 1, represents the software to implement the selection process. The software provides the record number or numbers for the user selected bins. Element 500, which is the element directly following element 400, represents the software to implement the process step of displaying the secondary display. FIG. 25 is a detailed flow chart representing the software process to perform the secondary display. Element 502 is the point of entry into the secondary display routine. Element 504, which is the element directly following element 502, represents the software to implement the process step of reading the compressed distribution record for the specified primary field. This software reads the compressed distribution for all records in the field that was previously displayed as illustrated in FIG. 23. Element 506, which is the element directly following element 504, represents the software to implement the process step of reading the compressed distribution record for the specified secondary field. Basically, this software process is responsible for locating the distribution just for the specified records in that field. The records were chosen by the user and implemented by the software process represented by elements 400 and 500 in FIG. 1. Element 508, which is the element directly following element 506, represents the software to implement the process step of building and expanding the secondary distribution record from the compressed record so that it can be properly displayed by the graphics software process represented by elements 400 and 500 in FIG. 1. Element 510, which is the element directly following element 508, represents the software to implement the process step of terminating processing of the secondary display routine.

Figure 26:
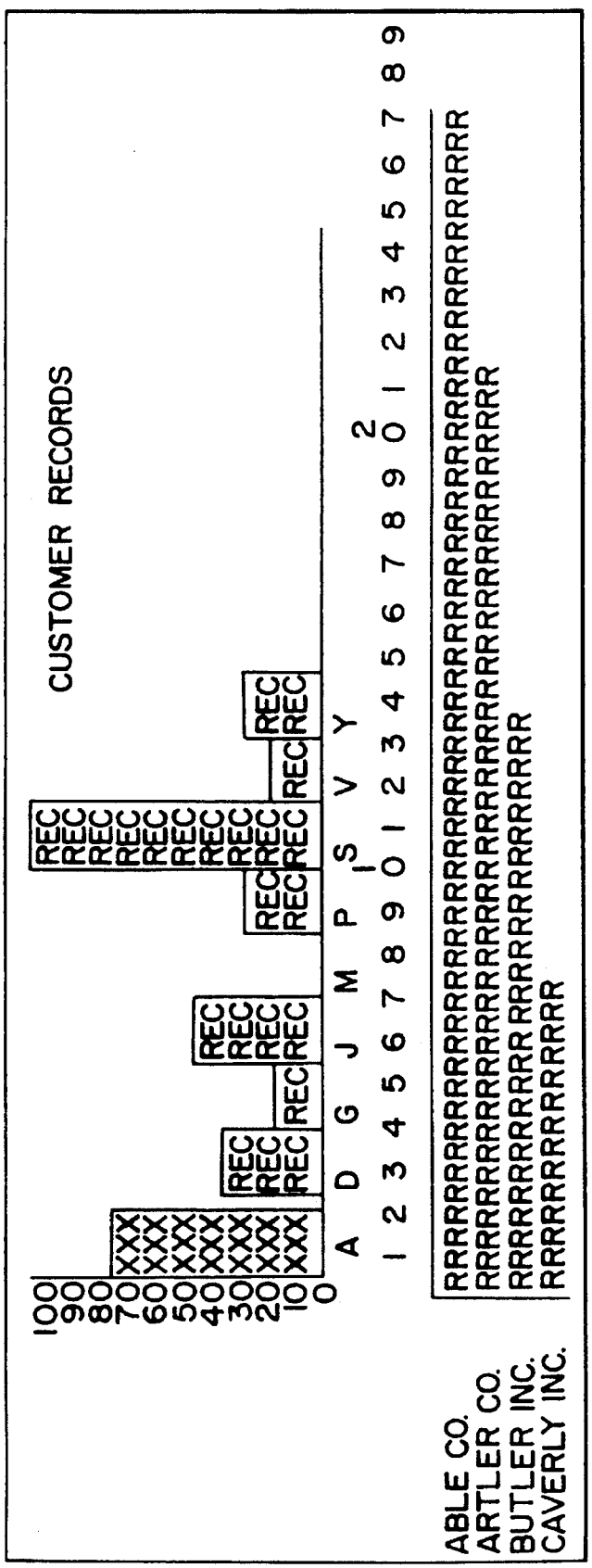
FIG. 26 is a sample secondary graphical display output of the present invention.

Referring now to FIG. 26, there is shown a secondary display of the first bar of the bar chart in FIG. 23. The secondary display, as stated previously, is a result of the selection made by the user. The background color of the display is still gray, and the main bar graph or chart is still red; however, the selected bar, the one indicated by X's instead of REC's, is now a blue color to indicate that a selection has been made. In addition, a new chart representing the details of the selected bar is placed along the bottom of the display screen in blue. The detailed chart located at the bottom of the display breaks down the original bar, selected by the user, into a detailed graphical display. For example, the detailed chart illustrates the four customer companies and how many records for each of the named companies, whereas the original bar chart only illustrates that there were a total of 70 records for companies starting with the letters A, B, and/or C.

Figure 27:
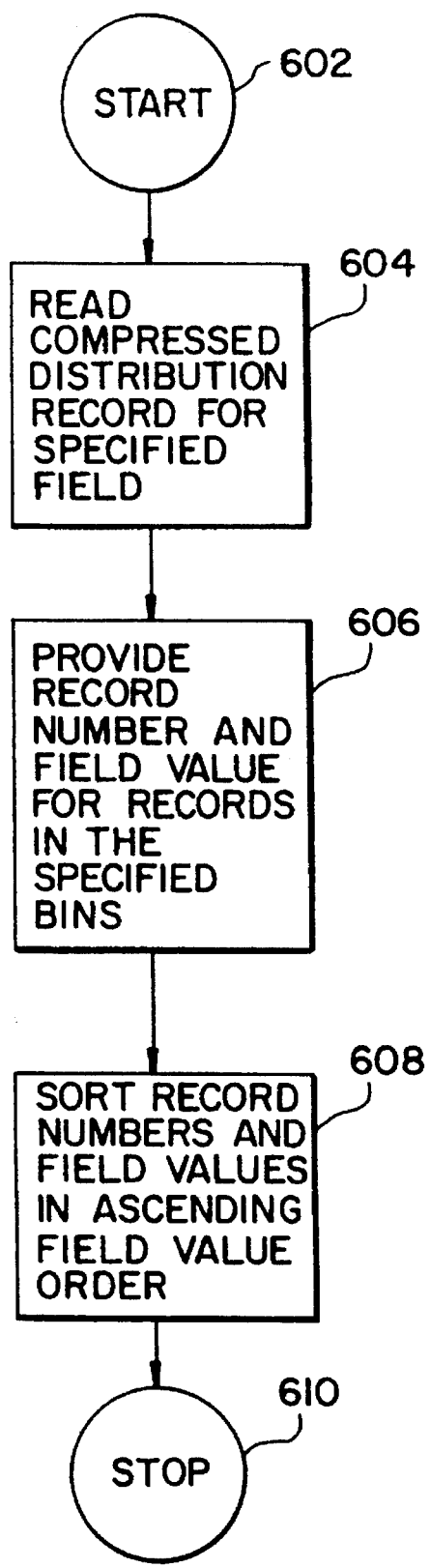
FIG. 27 is a first detailed flow chart representing the testiary display software of the present invention.
Figure 28:
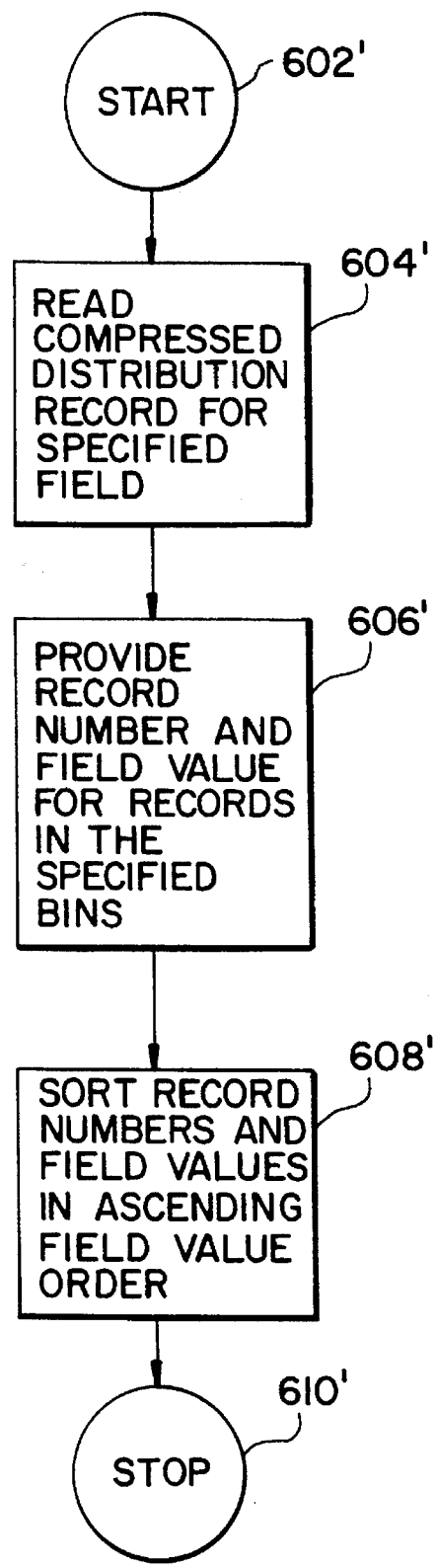
FIG. 28 is a second detailed flow chart representing the testiary display software of the present invention.

The user may now select a single bar or bars from the detail graph. A selection from the detail graph is referred to as a tertiary display. In a tertiary display, the user may also request that the selected data be presented as a list box with further selection capability. Referring once again to FIG. 1, element 600, which is the element directly following element 500, represents the software process to display the selected records as a tertiary display and also to provide a list box if required. FIGS. 27 and 28 are detailed flow charts representing the software processes to display the selected tertiary display and provide a list box for the selection. FIGS. 27 and 28 represent identical code or software; however, the code represented by the flow chart in FIG. 27 is for the secondary records while the code represented by the flow chart in FIG. 28 is for the tertiary records. The elements of the flow chart in FIG. 28 are numbered with identical numbers as those in the flow chart of FIG. 27 except with the addition of primes. Any differences in the code are indicated. Element 602 is the point of entry into the tertiary display routine. Element 604, which is the element directly following element 602, represents the software to implement the process step of reading in the compressed distribution records utilized for the secondary display for the specified field. In FIG. 28, element 604' represents the software to implement the process step of reading in the compressed distribution records utilized for the tertiary display for the specified field. Element 606, which is the element directly following element 604, represents the software to implement the process step of determining the specific record number and field values for the specified bins so that the data may be displayed. Element 608, which is the element directly following element 606, represents the software to implement the process step of sorting the record numbers and field values for use in creating a list box of the selections made. This software is a basic sort routine or utility which sorts the record numbers and field values in ascending field value order. The use of the field listing is made apparent in the description of a tertiary display. Element 610, which is the element directly following element 608, represents the software to implement the process step of terminating the processing of this routine and passes processing control to the software represented by the flow chart of FIG. 28.

Figure 29:
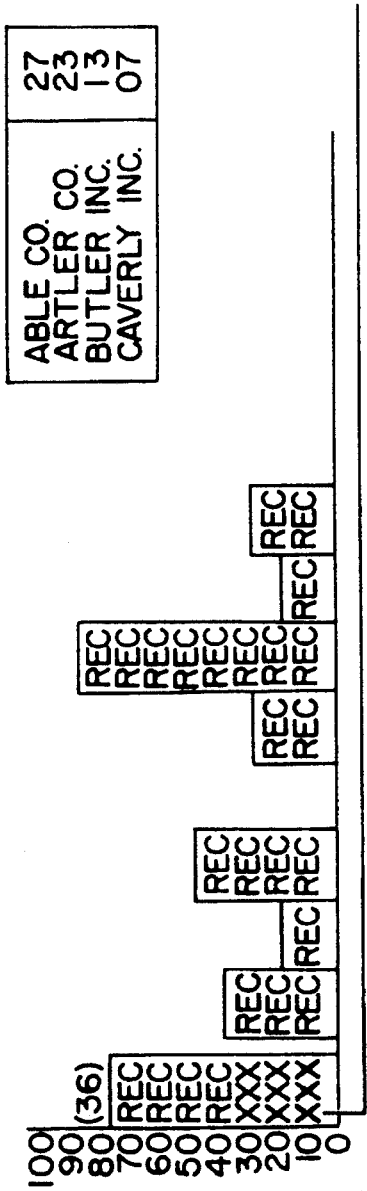
FIG. 29 is a sample testiary graphical display and list box output of the present invention.

FIG. 29 provides an example of a tertiary display. The background color is still grey, the main bar chart is still red; however, blue is utilized to display the selected records from the detailed bar. In this case, the first 30 entries in the first bar have been selected, accordingly, they appear in blue on the display and are represented as X's in the bar as opposed to REC's. In addition, the selected companies, ARTLER and BUTLER, have their records in the detailed chart appear in blue, as indicated by X's, while the other two companies appear in red as indicated by the REC's. Also, the listing box which provides a listing of the companies and the number of records associated with each is provided in two colors; namely blue for the selected companies and red for the others. The only limiting factor on what level display can be made is the number of records in a bin. Basically, what this means is that a detailed display can be made up to the last record in a bin or field.

Figure 30:
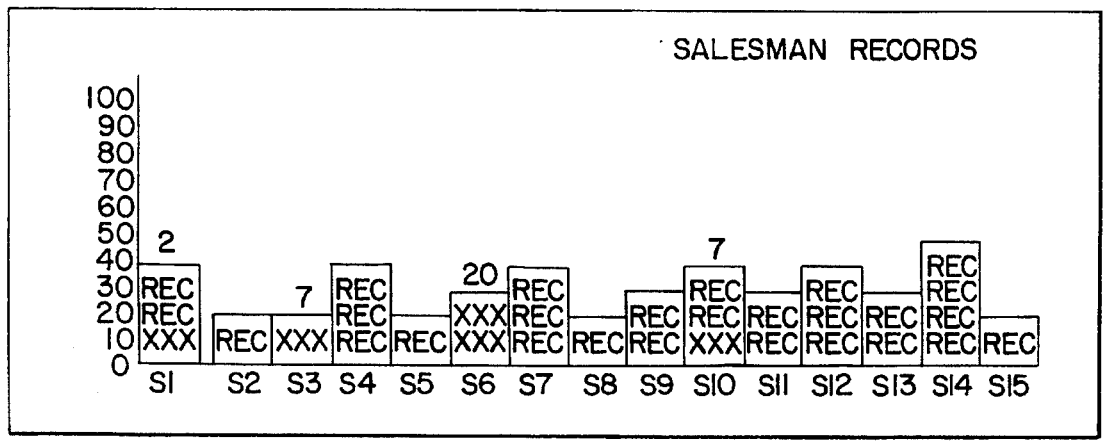
FIG. 30 is a sample graphical display output illustrating the selection process of the present invention.
Figure 31:
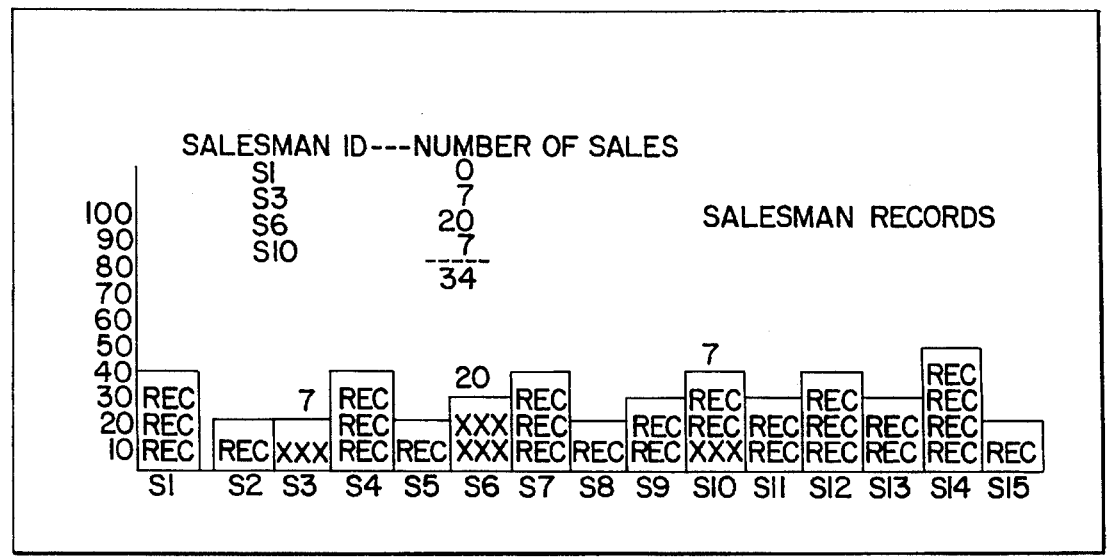
FIG. 31 is a sample graphical display output illustrating the deselection process of the present invention.
Figure 32:
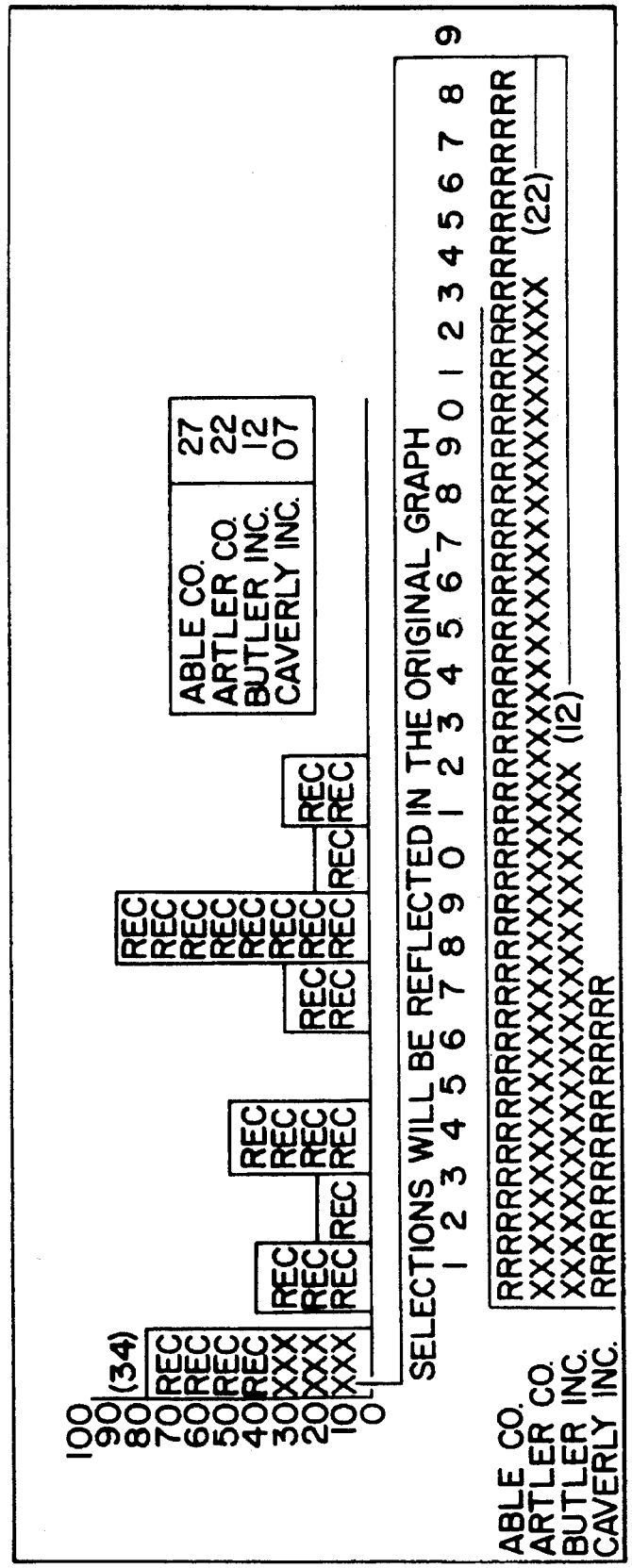
FIG. 32 is a sample graphical display output illustrating the ripple effect of the deselection process of the present invention.

FIG. 30 illustrates another aspect of the distribution indexing methodology. FIG. 30 illustrates the number of records that contain a sale made by a given salesman. The highlighted or blue records indicated by the X's in the figure, are the identification of which sales were made to the selected companies shown in FIG. 26, i.e. companies having their names beginning with the letters A, B, and/or C. Basically, this figure illustrates the effect of the selection process made in FIG. 26. If no selection had been made to get to FIG. 26, then all the salesman records would appear in red, REC's, or not highlighted. Therefore, as illustrated by this figure, the selection of particular companies in one display shows up on the display of different items such as in this case, salesmen in a different display. The system user further has the capability of making a selection to eliminate a given salesman. FIG. 31 illustrates the display after salesman 1, S1, has been eliminated. Accordingly, the number of total sales has been reduced by 2, which is the number of sales salesman 1 was responsible for as indicated in FIG. 31. The effect of the selection to eliminate salesman 1 or to deselect him can be seen in the customer records display as shown in FIG. 32. As can be seen in this figure, the customer records have been reduced to account for the loss of salesman 1. Therefore, one can see that the selection process works in both directions. The effect of a selection or deselection alters the related distributions, thereby effecting the results in all other related displays.

The use of this distribution indexing methodology is extremely powerful in that the effect of various selections and deselections are reflected in all other data fields which comprise a given database. The methodology also comprises a "what if" and "commit" mode of operation. For example, if instead of actually making a specific selection, the system user would only like to see what the effect of the selection would be without actually making the change, he or she could make a "what if" selection. If the "what if" selection is made, the "what if" selected data is displayed in yellow, and the user can determine if this is what he or she desires to do. If it is what the user wants, then the user hits the "commit" command and the selection is made and displayed in blue as before. If this is not what the user wants, then a different "what if" can be done or a different selection can be made.

Figure 33:
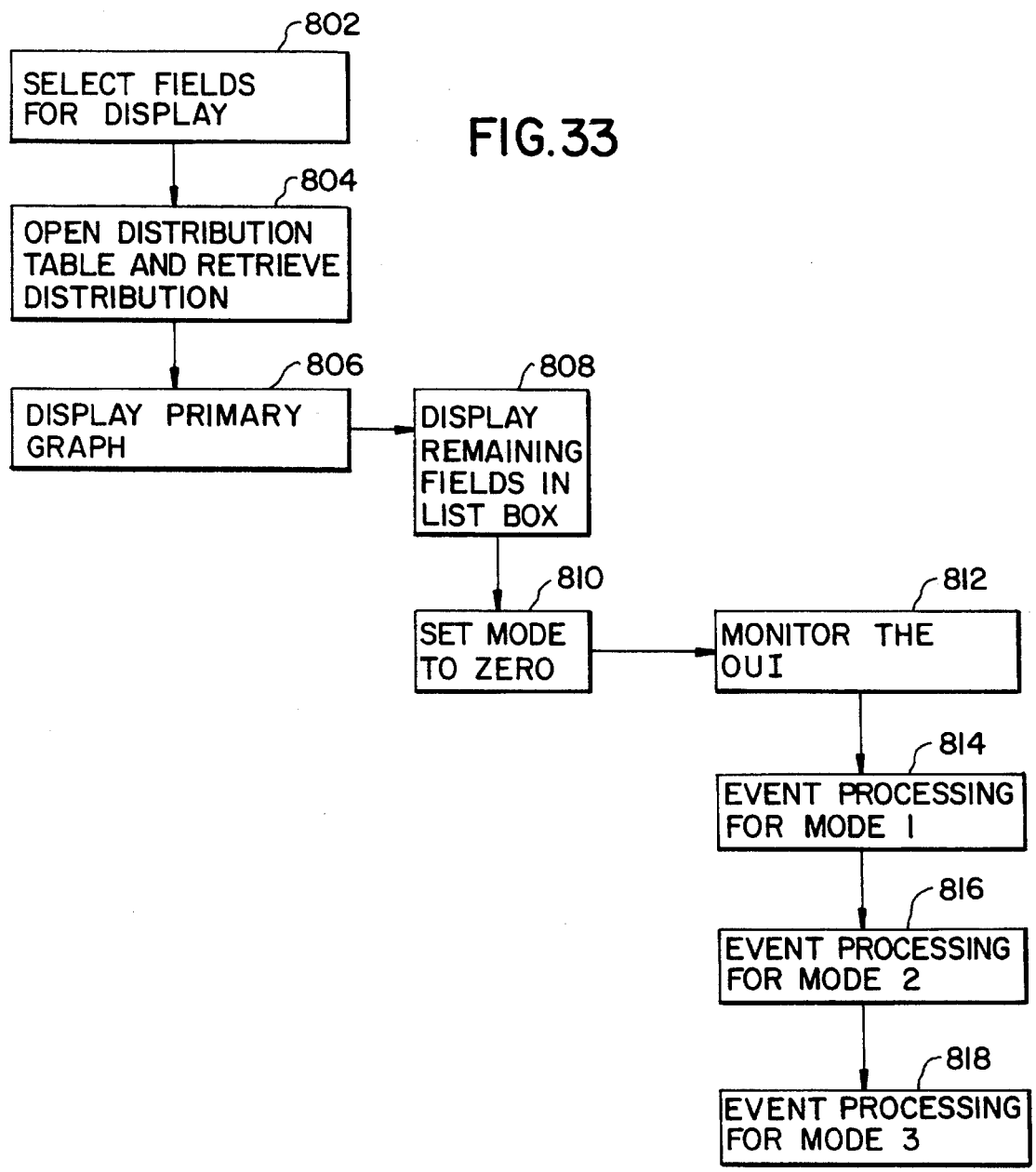
FIG. 33 is a flow chart representing the entire graphical interface software routine of the present invention.

Referring now to FIG. 33, there is shown a high level flow chart representing the dbEXPRESS™ graphical interface procedure described in detail in the preceding paragraphs. The software for monitoring the dbEXPRESS™ graphical interface is primarily event driven. When an event occurs, such as selecting a button, dbEXPRESS™ reacts to the event. The action that is performed by dbEXPRESS™ depends upon which mode of operation dbEXPRESS™ is currently processing. The dbEXPRESS™ software is capable of operating in one of three modes. Mode 1 of operation is the primary graph display mode, mode 2 of operation is the detail graph display mode, and mode 3 of operation is the list box display mode.

In dbEXPRESS™ mode 1, which is implemented by the software represented by element 300 in FIG. 1, the system user can view any field distribution graph by selecting a field from a selection list box and selecting the display button. When this event occurs, the software will implement a process which will remove the current field distribution graph, if any is already displayed, and replace it with the selected fields primary distribution graph. Elements 802, 804, 806, and 808 of FIG. 33 represent the software process' to implement the mode 1 procedure. Element 802 represents the software process to allow the system user to select a field or fields from the selection list box so that they may be displayed. Element 804, which is the element directly following element 802, represents the software to implement the process step of opening the selected distribution table(s) and retrieve the desired distribution so that it may be displayed. Element 806, which is the element directly following element 804, represents the software necessary to display the primary graph of the selected fields. Element 808, which is the element directly following element 806, represents the software to implement the process step of displaying the fields not selected in the selection list box. The remaining fields displayed in the selection list box are displayed so that the system user can make additional selections for primary graphical display. Each selection for primary graphical display results in a new graph as indicated above. Elements 802, 804, 806, and 808 provide a general description of the process implemented by element 300 in FIG. 1 and its associated detailed flow charts of FIGS. 21 and 22.

The remaining elements in FIG. 33 represent the software necessary to implement the processing for all three modes of operation. Element 810, which is the element directly following element 808, represents the software to implement the process step of initializing the mode count. Element 812, which is the element directly following element 810, represents the software to implement the process step of monitoring the graphical user interface to determine which mode of operation to enter into. Element 814, which is the element directly following element 812, represents the software to implement the processing of the events which occur in mode 1 of dbEXPRESS™ operation. The events for mode 1 of operation have been described above. Element 816, which is the element directly following element 814, represents the software to implement the processing of the events which occur in mode 2 of dbEXPRESS™ operation. Element 818, which is the element directly following element 816, represents the software to implement the processing of the events which occur in mode 3 of dbEXPRESS™ operation. Details of event processing for modes 2 and 3 of dbEXPRESS™ operation are given in the following paragraphs and are related to the various previously described detailed flow charts.

In mode 2 of operation, the system user has the ability to expand the data display for a given bar, if a bar graph is utilized as the display, in the primary display and to select and deselect all of the records for any bar being displayed. This processing is implemented by the software processes represented by elements 400 and 500 in FIG. 1. The processing for selecting and deselecting a bar is done by moving the mouse to a bar and clicking or depressing the right button of the mouse. It should be noted, however, that the mouse is utilized only to illustrate the procedure. In actuality, the selection itself can be made through a keyboard operation, a touch screen button, or even a light pen operation. Regardless of how the actual selection is made, the software will retrieve the bin selection count. If the count is greater than 0, then the selection count is set to 0 and the particular bar is shaded in red, indicating that no selection has been made. If on the other hand, the count is equal to 0, then the selection count is set to the total count and the bar is shaded in blue indicating that a selection has been made. The software process will then update, for every field, the bin records selection count. The software responsible for this processing is represented by the detailed flow chart in FIG. 25. The software process represented by the flow chart in FIG. 25 is called for every field indicating the primary fields select bin records count and the total number of selected records.

The technique for the expansion of the data as described above is accomplished as follows. For every primary bar graph, there exists for each bar in the graph a range of bin numbers, the coordinates of the bar, which is the bar hot region for placement of the mouse, the number of selected records, "what if" records, and the total number of records in or represented by the bar. When the system user selects a bar, an event will occur. The bar is selected by positioning the mouse in a bar hot spot region and clicking or depressing the left button. When the left button is clicked, the dbEXPRESS™ mode will change from mode 1 to mode 2 and the primary display graph will be removed. The mode 2 software will retrieve the selected bar bin range, build the detail graph and then display the graph. In mode 2, the software will monitor for three specific mode events. This software process step is represented by element 816 in FIG. 32. Event 1 of mode 2 is simply a return to the primary display graph. This event occurs when the mouse is positioned anywhere in the graph region and the left button on the mouse is clicked or depressed. The software will change the present mode of operation back to mode 1, remove the currently displayed graph and redraw the primary graph. Event 2 of mode 2 is the select/deselect option for a given or selected bar in a graph. This event occurs when the right button of the mouse is clicked on and the mouses cursor position is in a particular bar's hot region. The actual process for selecting and deselecting has been previously described in the proceeding paragraphs. Event 3 of mode 2 is a display selected bar's records option. This event occurs when the system user selects the select display bar value button and the particular bar. This is done by clicking the mouse on the display button, positioning the mouse on the particular bar's hot region and depressing the right button. When this event occurs, the software process will remove the detail display box, and set the mode to mode 3.

When mode 3 is initiated, the software process represented by the flow chart in FIG. 27 will retrieve the records for the selected bar and display the records in a list box. When the retrieval software, represented by the flow chart on FIG. 27, is called to retrieve the data, the information required is the bin range of the bar, the field distribution record, and the select record data retrieve mode (selected records or not-selected records). The retrieved software will retrieve the record index and values contained within the bin range for the selected bar. The values of the or corresponding to the record will then be displayed in the list box. It is important to note that up to this point in the processing the only input/output operation that has occurred was when the distribution table was generated and the distribution records for each field was read.

There are two events that are monitored while in mode 3. The software allows the system user to select or deselect any records in the list box simply by positioning the mouse cursor on a record and depressing the left button. When the record is selected or deselected it will be shaded in either blue, which indicates a selection has been made, or red, which indicates that no selection has been made. The system user may then perform two events; namely, select the cancel button or select the commit button. When the cancel event occurs the list box and buttons will be removed, the mode will be set to mode 2, and the detail graph from mode 2 will be redrawn. The commit event will investigate that list box setting and update the selected bars bin count. After the select code for the bar has been updated the list box will be removed and the detail graph will be redrawn and the mode set to mode 2. The event processing is accomplished by the software process step represented by element 818.

Referring back to FIG. 1 once again, the remaining elements are now described. Element 700, which is the element directly following element 600, represents the software process to provide the users with various user selection output modes for the graphical displays. The output modes for the displays can be in tabular format output, two-dimensional graphic output, and three-dimensional graphic output. The software also provides for the outputting of the data. The data can be output to a disk 702, a printer 704, a CRT 706 or a local area network or a modem 708. The user makes the particular selections.

While the invention has been particularly shown and described with respect to the preferred embodiments thereof, it should be understood by those skilled in the art that the foregoing and other changes in form and details may be made therein without departing from the spirit and scope of the invention which should be limited only by the scope of the appended claims.

What is claimed is:

1. An interactive method for selecting and displaying data and information about said data in a selected data structure, said selected data structure having a particular file structure associated therewith and comprising at least a plurality of data records, and a plurality of data fields having data therein, said method comprising the steps of:

(a) accessing said selected data structure resident on a host system and reading the data therein to determine selected parameters of the distribution of said data:

(b) building a plurality of distribution matrices from data contained within said selected data structure with each matrix having at least one data summary associated therewith; and (c) interactively generating at least one display from said plurality of distribution matrices for said selected data structure to provide a graphical representation of the distribution of data contained within said selected data structure.

2. The method for selecting and displaying data according to claim 1 which further includes the step of selecting a set of data from said selected data structure and then generating a display representative of said set.

3. The method for selecting and displaying data according to claim 1, wherein said step of accessing said selected data structure comprises the steps of:

(a) retrieving each of said plurality of data records within said selected data structure;

(b) reading each data field in one of said plurality of data records, and converting the data in said data field to a distribution data file; and (c) repeating step (b) for each of said plurality of data records to form a master distribution data file for said selected data structure.

4. The method for selecting and displaying according to claim 1, wherein said step of building a plurality of distribution matrices further comprises the step of compressing all information contained in said plurality of distribution matrices into a master distribution matrix.

5. The method of selecting and displaying according to claim 4, wherein said step of generating a display from said plurality of distribution matrices for said selected data structure comprises the steps of:

(a) opening at least said master distribution matrix to be displayed; and (b) displaying the distribution of data contained in said mater distribution matrix in a graphical format.

6. The method of selecting and displaying according to claim 5, wherein said step of generating a display from said plurality of distribution matrices for said selected data structure further comprises the step of expanding the compressed information contained in said master distribution matrix.

7. An interactive method for selecting and displaying a distribution of data in a selected data structure, said selected data structure having a particular file structure associated therewith and comprising at least a plurality of data records and data fields having data therein, said method comprising the steps of:

(a) accessing said selected data structure resident on a host system and reading the data therein to determine selected parameters of the distribution of said data;

(b) building a plurality of distribution matrices from data contained within said selected data structure with each matrix having a plurality of data bins and data summaries associated therewith to form a master distribution matrix;

(c) generating a first display from said master distribution matrix for said selected data structure to provide a graphical representation of the distribution of data contained within said selected data structure, said first display providing a range of data values for each selected field; and (d) interactively modifying a specific range of data values for a selected data field in said first display, and thereafter generating a second display to determine the representative effect of said modification upon the master distribution matrix.

8. An interactive method for selecting and displaying a distribution of data in a selected data structure, said selected data structure having a particular file structure associated therewith and comprising at least a plurality of data records and data fields having data therein, said method comprising the steps of:

(a) accessing said selected data structure resident on a host system and reading the data therein to determine selected parameters of the distribution of said data;

(b) building a plurality of distribution matrices from data contained within said selected data structure with each matrix having a plurality of data bins and data summaries associated therewith to form a master distribution matrix;

(c) selecting a set of data fields from said plurality of fields to form a selected set of data fields; and (d) interactively generating at least a first display from said master distribution matrix for said selected set of data fields to provide a graphical representation of the distribution of data contained within said selected set of data fields, said first display providing a range of data values for each selected field.

9. The method of selecting and displaying according to claim 7, wherein said method further comprises the step of generating a third display of a detailed distribution for a selected range of said master distribution matrix to provide a detailed graphical representation of the data contained within the selected range of said master distribution matrix.

10. The method for selecting and displaying according to claim 9, wherein said step of accessing said selected data structure comprises the steps of:

(a) retrieving each of said plurality of data records within said selected data structure;

(b) reading each data field in one of said plurality of data records, and converting the data in said data field to a distribution data file; and (c) repeating step (b) for each of said plurality of data records to form a master distribution data file for said selected data structure.

* * * * *